United States Patent
Nagata et al.

(10) Patent No.: US 10,421,431 B2
(45) Date of Patent: Sep. 24, 2019

(54) WEBBING TAKE-UP CONTROLLING DEVICE

(71) Applicant: KABUSHIKI KAISHA TOKAI-RIKA-DENKI-SEISAKUSHO, Aichi-ken (JP)

(72) Inventors: Yuya Nagata, Aichi-ken (JP); Tomonari Umakoshi, Aichi-ken (JP); Takuhiro Saito, Aichi-ken (JP); Takahiro Osaki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 275 days.

(21) Appl. No.: 15/602,663

(22) Filed: May 23, 2017

(65) Prior Publication Data

US 2017/0341626 A1 Nov. 30, 2017

(30) Foreign Application Priority Data

May 26, 2016 (JP) .................................. 2016-105643

(51) Int. Cl.
*B60R 22/46* (2006.01)
*B60R 22/48* (2006.01)

(52) U.S. Cl.
CPC .............. *B60R 22/48* (2013.01); *B60R 22/46* (2013.01)

(58) Field of Classification Search
CPC .................................. B60R 22/46; B60R 22/48
See application file for complete search history.

(56) References Cited

U.S. PATENT DOCUMENTS

| 5,568,939 A * | 10/1996 | Blackburn | B60R 21/01 180/282 |
| 2003/0226704 A1* | 12/2003 | Aoki | B60R 22/44 180/271 |
| 2007/0051841 A1 | 3/2007 | Mori | |
| 2009/0284205 A1* | 11/2009 | Yamamoto | B60R 21/017 318/490 |
| 2010/0095787 A1 | 4/2010 | Murphy et al. | |
| 2012/0098324 A1* | 4/2012 | Fouilleul | B60R 21/013 297/480 |
| 2013/0341451 A1* | 12/2013 | Saito | B60R 22/46 242/381.5 |

FOREIGN PATENT DOCUMENTS

| EP | 2444289 A1 | 4/2012 |
| EP | 3061657 A1 | 8/2016 |
| JP | 2002-087210 | 3/2002 |
| JP | 2007-099257 A | 4/2007 |

OTHER PUBLICATIONS

Extended European Search Report dated Oct. 19, 2017 in the corresponding EP Application No. 17172374.5.

* cited by examiner

*Primary Examiner* — Sang K Kim
(74) *Attorney, Agent, or Firm* — Roberts Mlotkowski Safran Cole & Calderon, P.C.

(57) ABSTRACT

A webbing take-up controlling device including: a motor that is configured to operate a centrifugal clutch; and a controller that controls a voltage applied to the motor such that, in the case of operating the centrifugal clutch, a first voltage lower than a target voltage to operate the centrifugal clutch is applied to the motor, and then the target voltage is applied to the motor.

5 Claims, 19 Drawing Sheets

WEBBING TAKE-UP CONTROLLING DEVICE

CROSS-REFERENCE TO RELATED APPLICATION

This application claims priority under 35 USC 119 from Japanese Patent Application No. 2016-105643 filed May 26, 2016, the disclosure of which is incorporated by reference herein.

BACKGROUND

Technical Field

The present disclosure relates to a webbing take-up controlling device for controlling a webbing take-up device that takes up the webbing of a seatbelt device.

Related Art

Webbing take-up devices in which a take-up mechanism is provided with a clutch and that take up webbing are known.

For example, Japanese Patent Application Laid-Open (JP-A) No. 2007-99257 proposes a motorized retractor in which the rotation speed of an output shaft of a motor is switched between a first speed and a second speed by an ECU and a driver such that the motorized retractor is able to switch a transmission route of rotation force from the motor to a spool between either a first drive force transmission section (a route through a meshing clutch and a slip mechanism) or a second drive force transmission section (a route through an overload mechanism and a centrifugal clutch).

However, when employing a centrifugal clutch as in JP-A No. 2007-99257, the centrifugal clutch is operated utilizing centrifugal force. Durability is therefore desired as inertial force acts in addition to centrifugal force during operation such that load during operation is greater than necessary.

SUMMARY

In consideration of the above circumstances, the present disclosure provides a webbing take-up controlling device capable of preventing a greater-than-necessary load from arising during operation of a centrifugal clutch.

In order to achieve the above object, a first aspect of the present disclosure is a webbing take-up controlling device including a motor that is able to operate a centrifugal clutch and a controller. The controller controls a voltage applied to the motor such that, in the case of operating of the centrifugal clutch, a first voltage lower than a target voltage to operate the centrifugal clutch is applied to the motor, and then the target voltage is applied to the motor.

According to the first aspect of the present disclosure, the motor is driven so as to be able to operate the centrifugal clutch utilizing rotation of the motor.

In the case of operating the centrifugal clutch, the controller controls a voltage applied to the motor such that a first voltage lower than the target voltage to operate the centrifugal clutch is applied to the motor, and then the target voltage is applied to the motor. Load acting on the centrifugal clutch is thereby distributed, and a load greater than the centrifugal force necessary to operate the centrifugal clutch is prevented from arising. Thus, a webbing take-up controlling device can be provided that is capable of preventing a greater-than-necessary load from arising during operation of a centrifugal clutch.

As in a second aspect of the present disclosure, the first voltage may employ a voltage which produces a load so that a combined load of a centrifugal force and an inertial force acting on the centrifugal clutch exceeds a centrifugal force to operate the centrifugal clutch. Applying such a first voltage to the motor enables the centrifugal clutch to be operated using the minimum load necessary.

As in a third aspect of the present disclosure, the controller may be configured to control the voltage applied to the motor such that, after the first voltage is applied, voltage is applied to the motor by raising the voltage to the target voltage in a stepwise manner. The controller performing such control of the voltage applied to the motor enables load acting on the centrifugal clutch to be distributed.

As in a fourth aspect of the present disclosure, the controller may be configured to control the voltage applied to the motor such that, after the first voltage is applied, voltage is applied to the motor by gradually raising the voltage to the target voltage. The controller performing such control of the voltage applied to the motor also enables load acting on the centrifugal clutch to be distributed.

As in a fifth aspect of the present disclosure, application may be made to a centrifugal clutch that is connected to a spool that takes up webbing, with the centrifugal clutch operated by the motor being driven when the webbing is to be taken up on the spool.

The present disclosure as described above is able to exhibit the advantageous effect of being able to provide a webbing take-up controlling device capable of preventing a greater-than-necessary load from arising during operation of a centrifugal clutch.

BRIEF DESCRIPTION OF THE DRAWINGS

Exemplary embodiments will be described in detail with reference to the following figures, wherein:

FIG. 9A is a side view illustrating a normal state of a clutch spring;

FIG. 9B is a side view illustrating a state in which an external diameter dimension of a coil portion of the clutch spring has been enlarged;

DETAILED DESCRIPTION

Explanation follows regarding a webbing take-up device, which is a control target of a webbing take-up controlling device according to an exemplary embodiment, with reference to FIG. 1 to FIG. 13.

Figure 1:
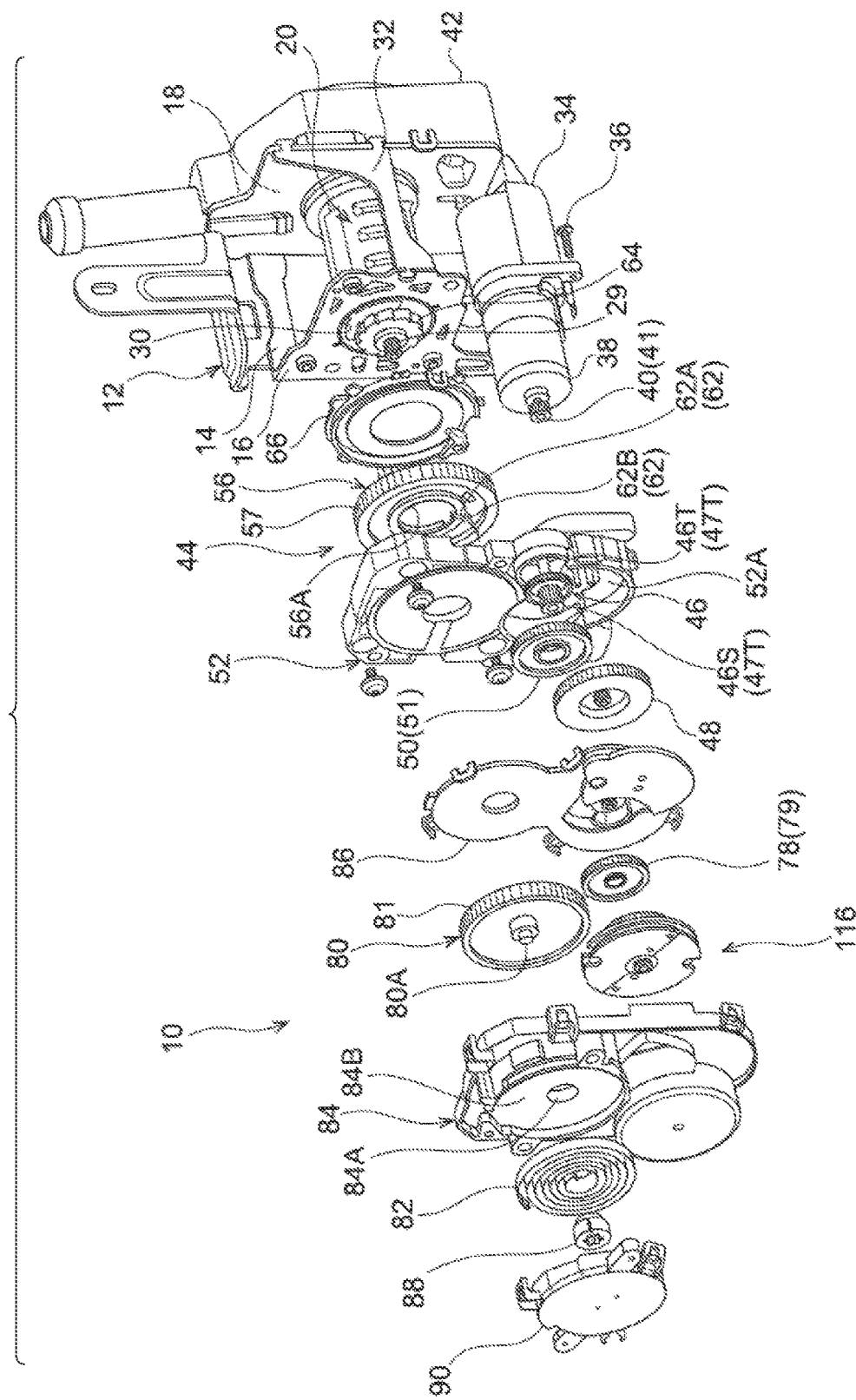
FIG. 1 is an exploded perspective view illustrating a webbing take-up device, which is a control target of a webbing take-up controlling device according to an exemplary embodiment.

FIG. 1 is an exploded perspective view illustrating a webbing take-up device 10, which is a control target of a webbing take-up controlling device according to the present exemplary embodiment.

As illustrated in FIG. 1, the webbing take-up device 10 includes a frame 12. The frame 12 includes a substantially plate-shaped back plate 14. The back plate 14 is fixed to a vehicle body by a fastening member, not shown in the drawings, such as a bolt, thereby fixing the webbing take-up device 10 to the vehicle body. A pair of parallel leg pieces 16, 18 extends from both width direction ends of the back plate 14, and a spool 20, manufactured by die-casting or the like, is rotatably disposed between the leg pieces 16, 18. Note that a connection piece 32 spans between the leg piece 16 and the leg piece 18.

The spool 20 is formed in a substantially circular cylinder shape. A base end portion of webbing formed in an elongated strap shape, not shown in the drawings, is fixed to the spool 20. Rotating the spool 20 toward one direction about its axis (in a direction referred to below as the "take-up direction") takes up the webbing onto an outer peripheral portion of the spool 20 in a layered shape from a base end side of the webbing. Pulling the webbing from its leading end side pulls out the webbing that has been taken up onto the outer peripheral portion of the spool 20, accompanying which the spool 20 rotates in the opposite direction to the rotation direction when taking up the webbing (the rotation direction of the spool 20 when pulling out the webbing is referred to below as the "pull-out direction").

A support shaft portion 29 stands out from an axial center portion at an end portion on the leg piece 16 side of the spool 20. The support shaft portion 29 passes through a circular hole 30 formed in the leg piece 16 substantially coaxially, and projects out to the outside of the frame 12. A ratchet 64, described later, is fixed to the support shaft portion 29 at a projection direction base end side of the support shaft portion 29. The ratchet 64 is thus capable of rotating together with the spool 20.

A motor 38 is fixed to a gear housing 52, described later, by a motor cover 34 and a screw 36. The motor 38 is disposed below the spool 20 and between the pair of leg pieces 16, 18 of the frame 12. An A-gear 40 formed with plural outer teeth 41 at an outer peripheral portion is fixed to an output shaft of the motor 38.

A support shaft portion, not shown in the drawings, stands out from an end portion on the leg piece 18 side of the spool 20. The support shaft portion passes substantially coaxially through a ratchet hole, not shown in the drawings, formed in the leg piece 18 and projects out to the outside of the frame 12. A lock base, on which a lock plate configuring part of a lock mechanism is supported, is fixed to the support shaft portion. In a vehicle emergency (for example, during sudden deceleration of the vehicle), the lock plate projects out from the lock base, and meshes together with an inner peripheral portion of the ratchet hole formed in the leg piece 18, preventing rotation of the spool 20 in the pull-out direction. A cover 42 that covers the lock mechanism and the like is fixed to the leg piece 18.

A gear housing 52, in which a first clutch 44, a B-gear 46, an OL-gear 48, and a C-gear 50 are housed, is fixed to the leg piece 16 by a screw 54.

Figure 2:
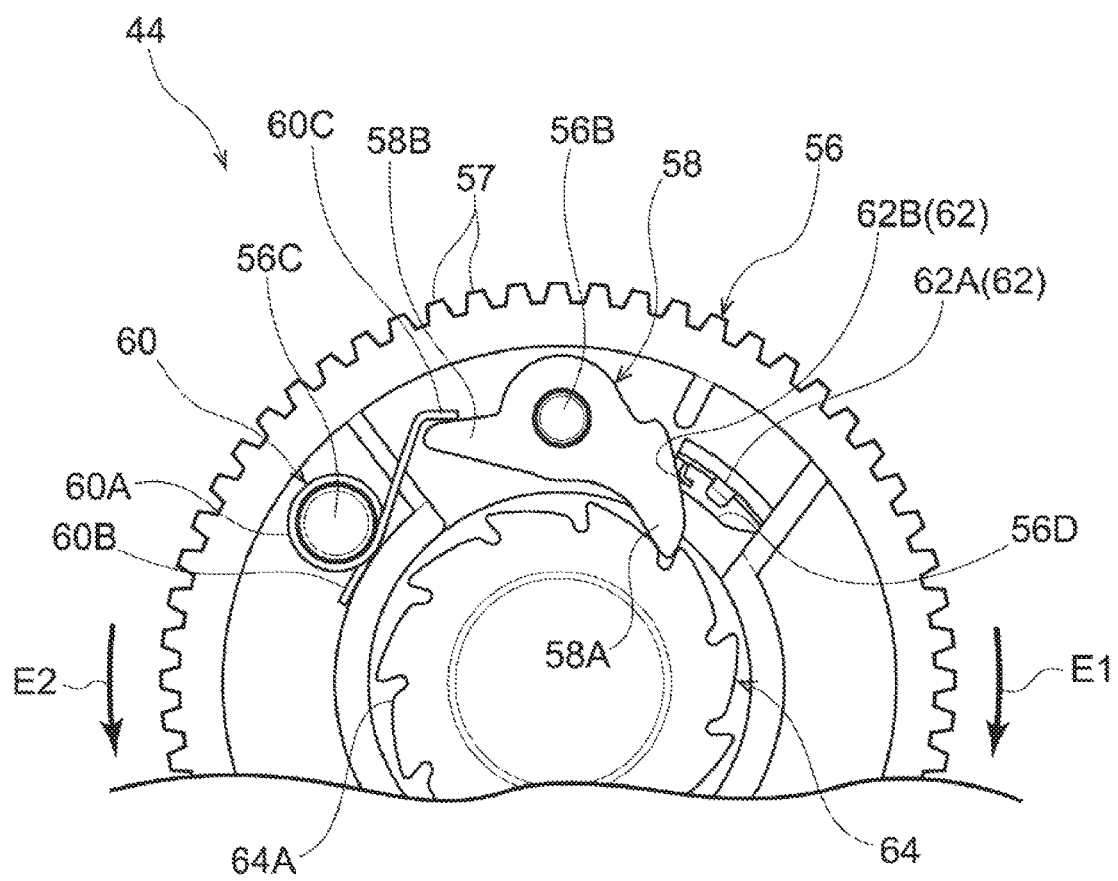
FIG. 2 is a side view of a first clutch as viewed from the side of a leg piece of a frame, illustrating a state in which a lock bar is engaged with a ratchet.

As illustrated in FIG. 2, the first clutch 44 is configured including a clutch gear 56 formed in a ring shape, a lock bar 58 and return spring 60 that are attached to the clutch gear 56, a friction spring 62, and the ratchet 64 that is fixed to the spool 20.

Specifically, plural outer teeth 57 are formed to an outer peripheral portion of the clutch gear 56, and, as illustrated in FIG. 1, a circular insertion hole 56A, through which the support shaft portion 29 of the spool 20 is inserted, is formed at an inner peripheral portion of the clutch gear 56. As illustrated in FIG. 2, a lock bar support shaft 56B and a return spring support shaft 56C that project out toward the leg piece 16 side and that are disposed at a separation to each other in the circumferential direction of the clutch gear 56 stand out from a radial direction intermediate portion of the clutch gear 56. A friction spring insertion hole 56D, through which part of the friction spring 62 is inserted, is formed at a circumferential direction intermediate portion of the clutch gear 56. As illustrated in FIG. 1, the clutch gear 56 described above is housed inside a housing recess formed on the leg piece 16 side of the gear housing 52. A first seat 66 is attached to the gear housing 52, thereby restricting movement of the clutch gear 56 toward the leg piece 16 side.

As illustrated in FIG. 2, the lock bar 58 is formed in a substantially half-moon shape as viewed along the axial direction of the clutch gear 56, and the lock bar 58 is capable of tilting due to being supported by the lock bar support shaft 56B provided to the clutch gear 56. One end portion of the lock bar 58 configures a ratchet engagement portion 58A that engages with the ratchet 64, and another end portion of the lock bar 58 configures a return spring abutting portion 58B that the return spring 60 abuts.

The return spring 60 includes a coil portion 60A that is coiled into a ring shape and that is supported by the return spring support shaft 56C provided to the clutch gear 56. One end portion of the return spring 60 configures an anchor portion 60B that extends out from the coil portion 60A and is anchored to part of the clutch gear 56. Another end portion of the return spring 60 configures an abutting portion 60C that extends out from the coil portion 60A and abuts the return spring abutting portion 58B of the lock bar 58. Urging force of the return spring 60 is input to the return spring abutting portion 58B of the lock bar 58, such that the ratchet engagement portion 58A of the lock bar 58 is kept separate from the ratchet 64.

Figure 3:
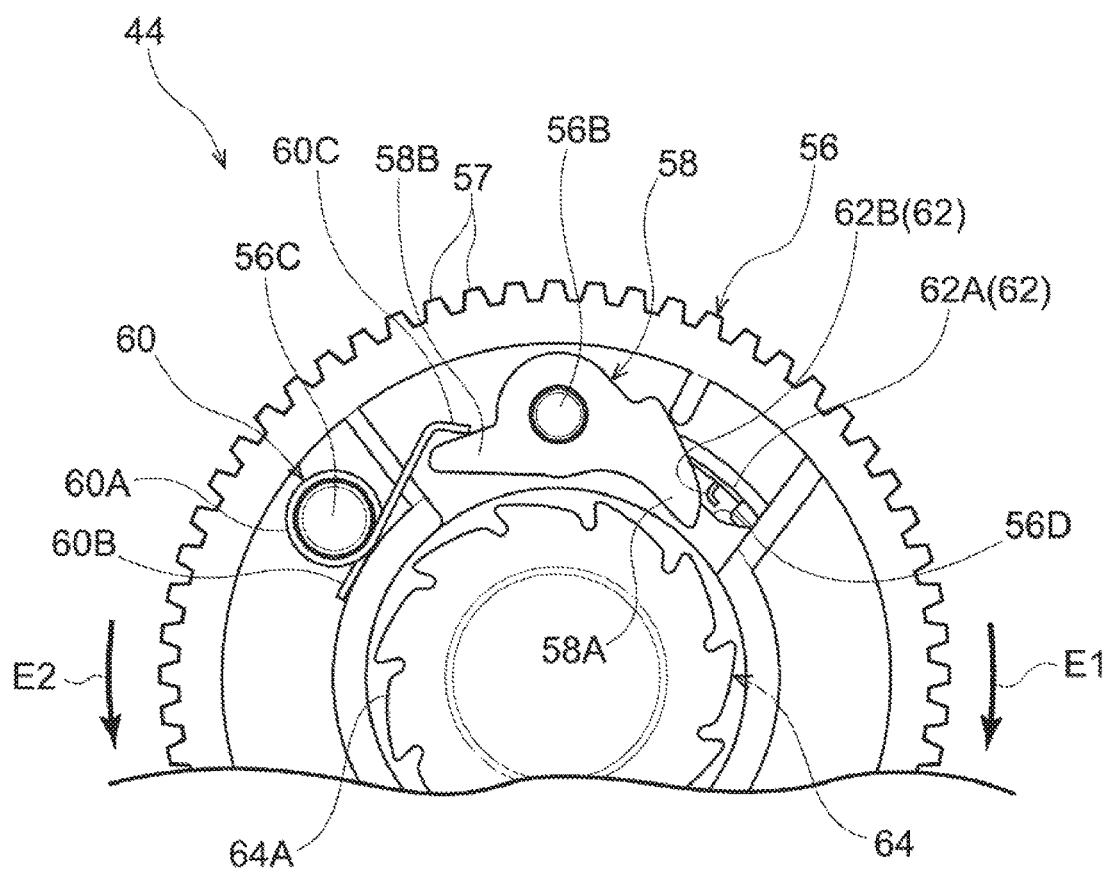
FIG. 3 is a side view corresponding to FIG. 2 of the first clutch as viewed from the side of the leg piece of the frame, illustrating a state in which the lock bar is not engaged with the ratchet.

As illustrated in FIG. 1, the friction spring 62 is provided between the clutch gear 56 and the gear housing 52. The friction spring 62 includes a sliding contact portion 62A that makes sliding contact with the gear housing 52 when the clutch gear 56 is rotated, and a pressing portion 62B that extends out from the sliding contact portion 62A toward the clutch gear 56 side, and is inserted through the friction spring insertion hole 56D formed in the clutch gear 56. As illustrated in FIG. 2, when the clutch gear 56 is rotated toward one axial direction side (the arrow E1 direction side), the pressing portion 62B of the friction spring 62 presses the ratchet engagement portion 58A of the lock bar 58. Moreover, when force input to the ratchet engagement portion 58A of the lock bar 58 from the pressing portion 62B of the friction spring 62 exceeds the urging force of the return spring 60, the lock bar 58 is tilted, and the ratchet engagement portion 58A of the lock bar 58 engages with the ratchet 64. Rotation force input to the clutch gear 56 is thereby input to the ratchet 64 through the lock bar 58, and the spool 20 is rotated in the take-up direction together with the ratchet 64. In contrast thereto, as illustrated in FIG. 3, when the clutch gear 56 is rotated toward another axial direction side (the arrow E2 direction side), force input to the ratchet engagement portion 58A of the lock bar 58 from the pressing portion 62B of the friction spring 62 does not exceed the urging force of the return spring 60, and so the ratchet engagement portion 58A of the lock bar 58 does not engage with the ratchet 64. Accordingly, the rotation force input to the clutch gear 56 is not input to the ratchet 64 through the lock bar 58.

The ratchet 64 is formed in a circular disk shape. Plural engaged-with outer teeth 64A that engage with the ratchet engagement portion 58A of the lock bar 58 are formed to an outer peripheral portion of the ratchet 64. As illustrated in FIG. 1, the ratchet 64 is fixed to the support shaft portion 29 of the spool 20 by press-fitting or the like.

The B-gear 46 includes a large diameter portion 46T formed with plural outer teeth 47T at an outer peripheral portion that mesh together with the outer teeth 41 of the A-gear 40, and a small diameter portion 46S disposed coaxially to the large diameter portion 46T and integrally formed to the large diameter portion 46T. An external diameter of the small diameter portion 46S is set smaller than an external diameter of the large diameter portion 46T, and an outer peripheral portion of the small diameter portion 46S is formed with plural outer teeth 47S that mesh together with the OL-gear 48, described below.

Figure 4:
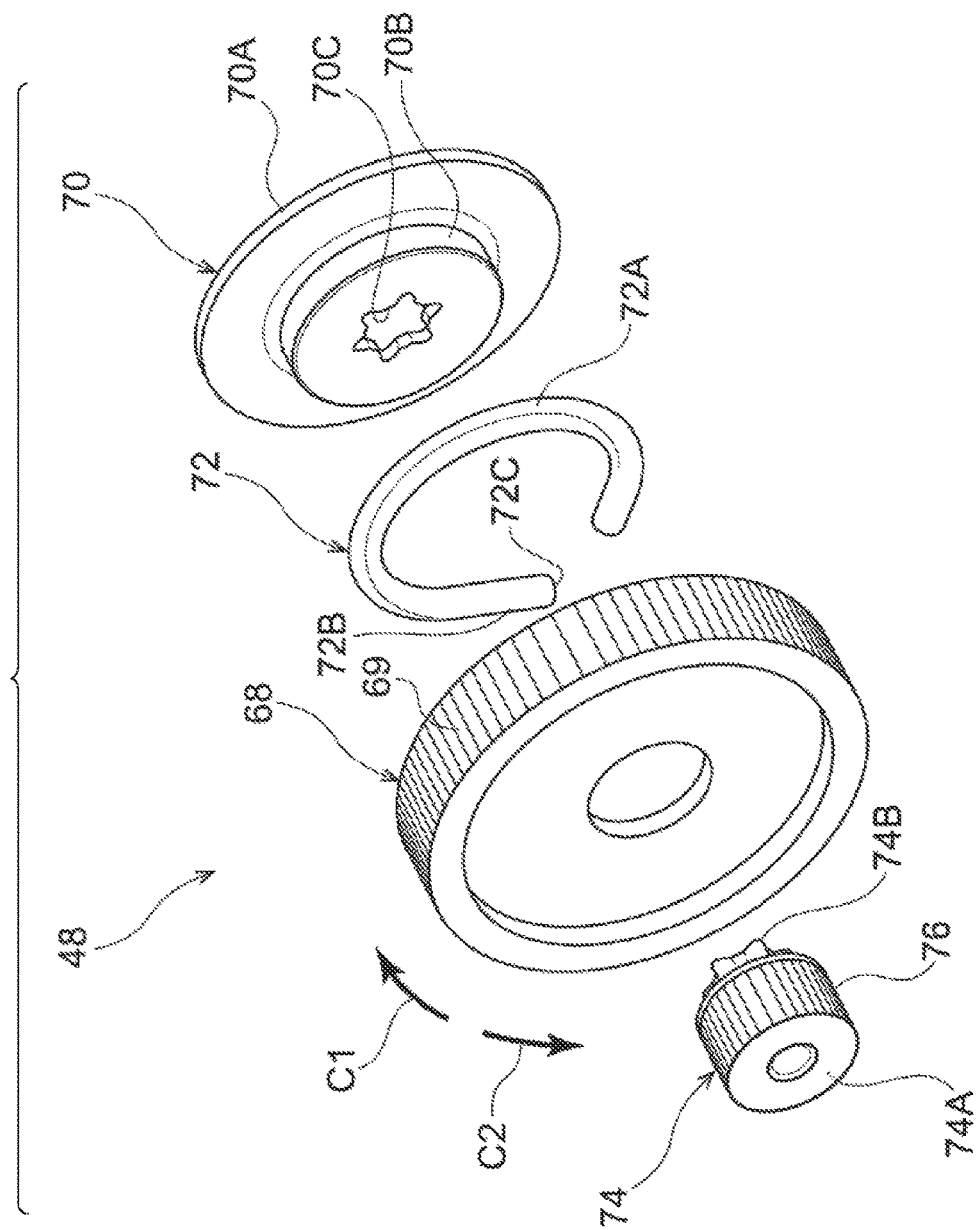
FIG. 4 is an exploded perspective view illustrating an OL-gear.

As illustrated in FIG. 4, the OL-gear 48 is configured including an input gear 68 that is rotated by rotation force transmitted from the B-gear 46 (see FIG. 1), a rotor 70 that is disposed coaxially to the input gear 68, a clutch spring 72 that is provided between the input gear 68 and the rotor 70, and an output gear 74 that is engaged with the rotor 70 so as to be capable of rotating as a unit with the rotor 70.

Figure 5:
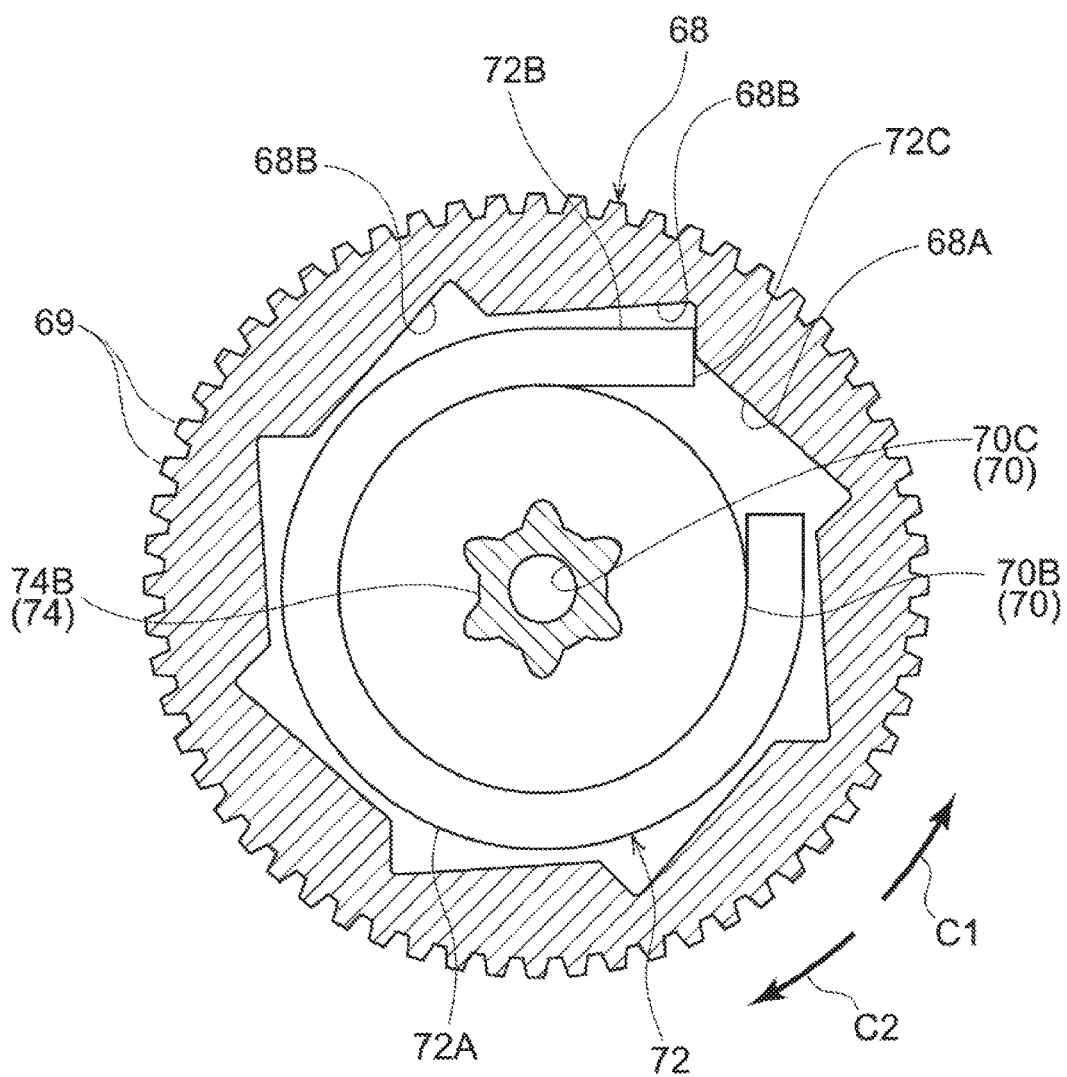
FIG. 5 is a cross-section taken along a radial direction of an OL-gear.

The input gear 68 is formed in a circular disk shape. Plural outer teeth 69 that mesh together with the outer teeth 47S formed to the small diameter portion 46S of the B-gear 46 are formed at an outer peripheral portion of the input gear 68. As illustrated in FIG. 5, the input gear 68 is formed with an indentation portion 68A opening toward the rotor 70 side and in which the clutch spring 72 and a wound-onto portion 70B of the rotor 70, described later, are disposed. Plural clutch spring engagement recesses 68B are formed around the circumferential direction of the input gear 68 at locations at the input gear 68 radial direction outside of the indentation portion 68A.

As illustrated in FIG. 4, the rotor 70 includes a circular disk portion 70A formed in a circular disk shape and the wound-onto portion 70B formed in a circular column shape projecting out from a location at the radial direction inside of the circular disk portion 70A toward the input gear 68 side. An axial center portion of the rotor 70, namely, an axial center portion of the wound-onto portion 70B, is formed with a spline shaped engagement hole 70C that engages with the output gear 74.

The clutch spring 72 includes a curved portion 72A that curves in a ring shape. In a state prior to attaching the clutch spring 72 to the wound-onto portion 70B of the rotor 70, an internal diameter of the curved portion 72A is a slightly smaller diameter than the external diameter of the wound-onto portion 70B of the rotor 70. The curved portion 72A is pressed onto the wound-onto portion 70B of the rotor 70 by enlarging the internal diameter of the curved portion 72A to engage the curved portion 72A with an outer peripheral face of the wound-onto portion 70B of the rotor 70. As illustrated in FIG. 5, one end portion of the clutch spring 72 configures an engagement portion 72B that engages with the clutch spring engagement recesses 68B of the input gear 68. When the input gear 68 is rotated toward one side (toward the arrow C1 direction), a portion of a clutch spring engagement recess 68B of the input gear 68 presses an end 72C of the engagement portion 72B. Rotation force input to the input gear 68 is thereby transmitted to the rotor 70 and the output gear 74 through the clutch spring 72. In contrast thereto, when rotation force in a direction to rotate the input gear 68 toward another side (toward the arrow C2 direction) acts on the input gear 68, another portion of the clutch spring engagement recess 68B of the input gear 68 presses the engagement portion 72B of the clutch spring 72 toward the side of the wound-onto portion 70B of the rotor 70. The engagement between the engagement portion 72B of the clutch spring 72 and the clutch spring engagement recess 68B accordingly becomes shallower. When rotation force toward the arrow C2 direction acting on the input gear 68 exceeds a predetermined value, the engagement between the engagement portion 72B of the clutch spring 72 and the clutch spring engagement recesses 68B is released. As a result, the OL-gear 48 does not transmit rotation force toward the arrow C2 direction exceeding a predetermined value. Tension arising in the webbing during pre-tensioning, described later, is thereby suppressed from reaching a predetermined value or greater.

The output gear 74 includes an output gear main body portion 74A, formed with plural outer teeth 76 at an outer peripheral portion that mesh together with the C-gear 50, and a spline shaped engagement portion 74B that is integrally formed to the output gear main body portion 74A and that is engaged with the engagement hole 70C formed in the rotor 70. The output gear 74 and the rotor 70 are coupled so as to be capable of rotating together as a unit due to engaging the engagement portion 74B of the output gear 74 together with the engagement hole 70C formed in the rotor 70.

As illustrated in FIG. 1, the C-gear 50 is formed in a circular disk shape that is formed with plural outer teeth 51 that mesh together with the outer teeth 76 (see FIG. 4) of the output gear 74 configuring part of the OL-gear 48, and with the outer teeth 57 of the clutch gear 56 configuring part of the first clutch 44. The C-gear 50 rotates the clutch gear 56 due to the C-gear 50 being rotated by the output gear 74 of the OL-gear 48.

In a state housed inside the housing recess 52A, the B-gear 46, the OL-gear 48, and the C-gear 50 described above are rotatably supported on shaft portions standing out inside a housing recess 52A formed to the gear housing 52.

A spring holder 84, on which an idle gear 78, a spool gear 80, a retractor spring 82, and a second clutch 116 are supported, is fixed to the gear housing 52.

The idle gear 78 is formed in a circular disk shape. Plural outer teeth 79 that mesh together with the spool gear 80 and the second clutch 116, described later, are formed at an outer peripheral portion of the idle gear 78. In a state housed inside a housing recess formed to a location on the gear housing 52 side of the spring holder 84, the idle gear 78 is rotatably supported on a shaft portion standing out inside the housing recess. A second seat 86 is attached to the spring holder 84, thereby restricting movement of the idle gear 78 toward the gear housing 52 side.

The spool gear 80, serving as a second rotating body, is formed in a circular disk shape set with a larger diameter than the idle gear 78. Plural outer teeth 81 that mesh together with the outer teeth 79 of the idle gear 78 are formed at an outer peripheral portion of the spool gear 80. An adaptor fixing portion 80A is formed projecting out toward the retractor spring 82 side at an axial center portion of the spool gear 80. An engagement hole, not shown in the drawings, with which the support shaft portion 29 of the spool 20 engages, is formed at a location on the spool 20 side of the axial center portion of the spool gear 80. The engagement hole of the spool gear 80 is engaged with the support shaft portion 29 of the spool 20, thereby coupling the spool gear 80 and the spool 20 so as to be capable of rotating together as a unit. The spool gear 80 is housed inside a housing recess formed at a location on the gear housing 52 side of the spring holder 84. In a housed state of the spool gear 80 inside the housing recess, the adaptor fixing portion 80A of the spool gear 80 projects out toward the retractor spring 82 side through an insertion hole 84A formed in a bottom wall of the housing recess.

The retractor spring 82 is formed in a flat spiral shape, and the retractor spring 82 is housed inside a spring housing portion 84B formed to the spring holder 84 on the opposite side to the side where the spool gear 80 is housed. An inner end portion of the retractor spring 82 is anchored to an adaptor 88 that is fixed to the adaptor fixing portion 80A of the spool gear 80. An outer end portion of the retractor spring 82 is anchored to an anchor portion, not shown in the drawings, formed inside the spring housing portion 84B. Urging force of the retractor spring 82 is transmitted to the spool 20 through the adaptor 88 and the spool gear 80, such that the spool 20 is rotation-urged toward the take-up direction. Note that (a take-up force in the webbing due to) the urging force of the retractor spring 82 is set so as to be comparatively weak, at a level that eliminates slack in the webbing when worn by an occupant. In other words, the urging force of the retractor spring 82 is set at a strength that does not constrict the occupant in a state wearing the webbing and that does not require enough strength to completely take up the webbing pulled out from the spool 20 against frictional force and the like acting on the webbing.

A spring cover 90 is attached to the spring holder 84. The retractor spring 82 housed inside the spring housing portion 84B is thereby covered by the spring cover 90.

Figure 6:
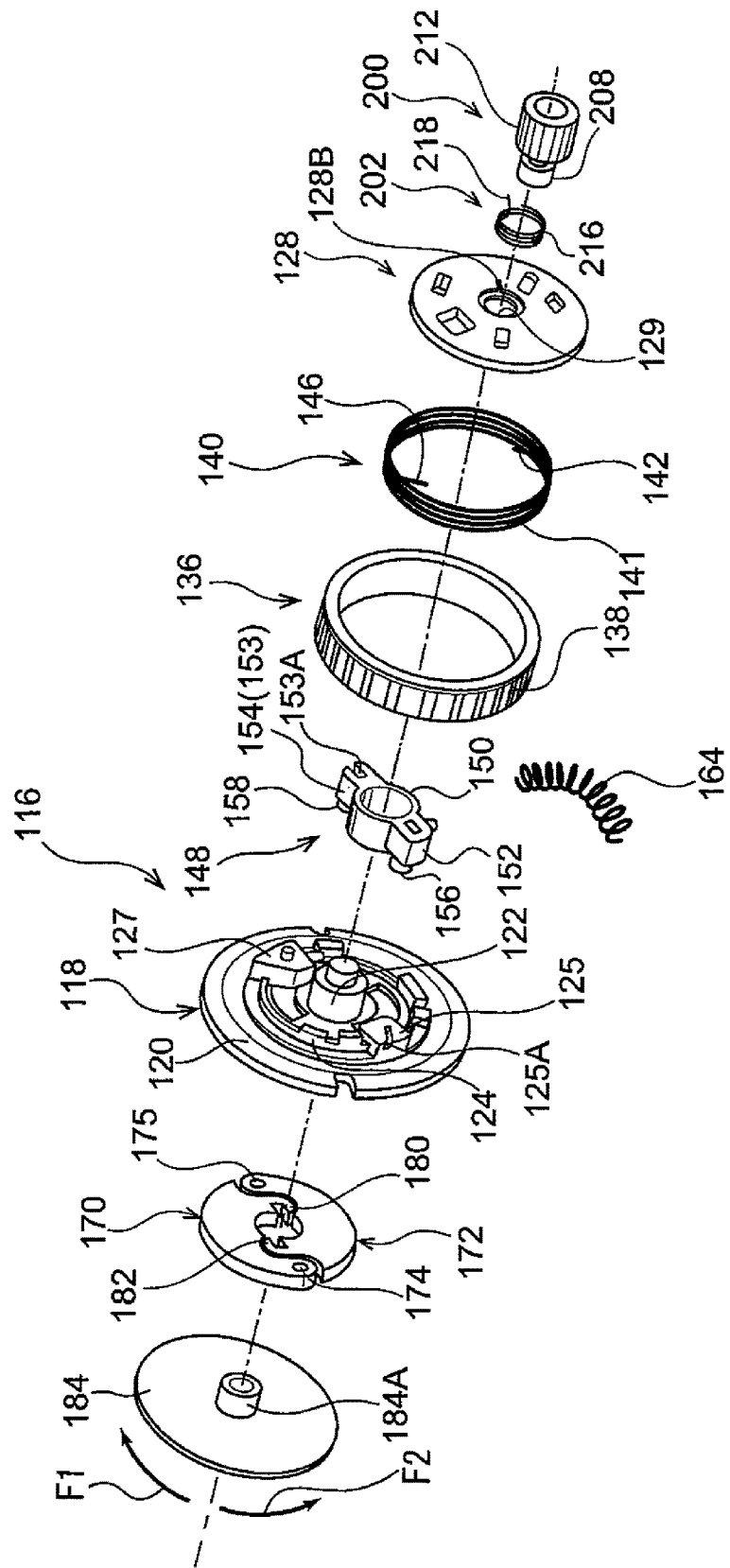
FIG. 6 is an exploded perspective view illustrating a second clutch.
Figure 7:
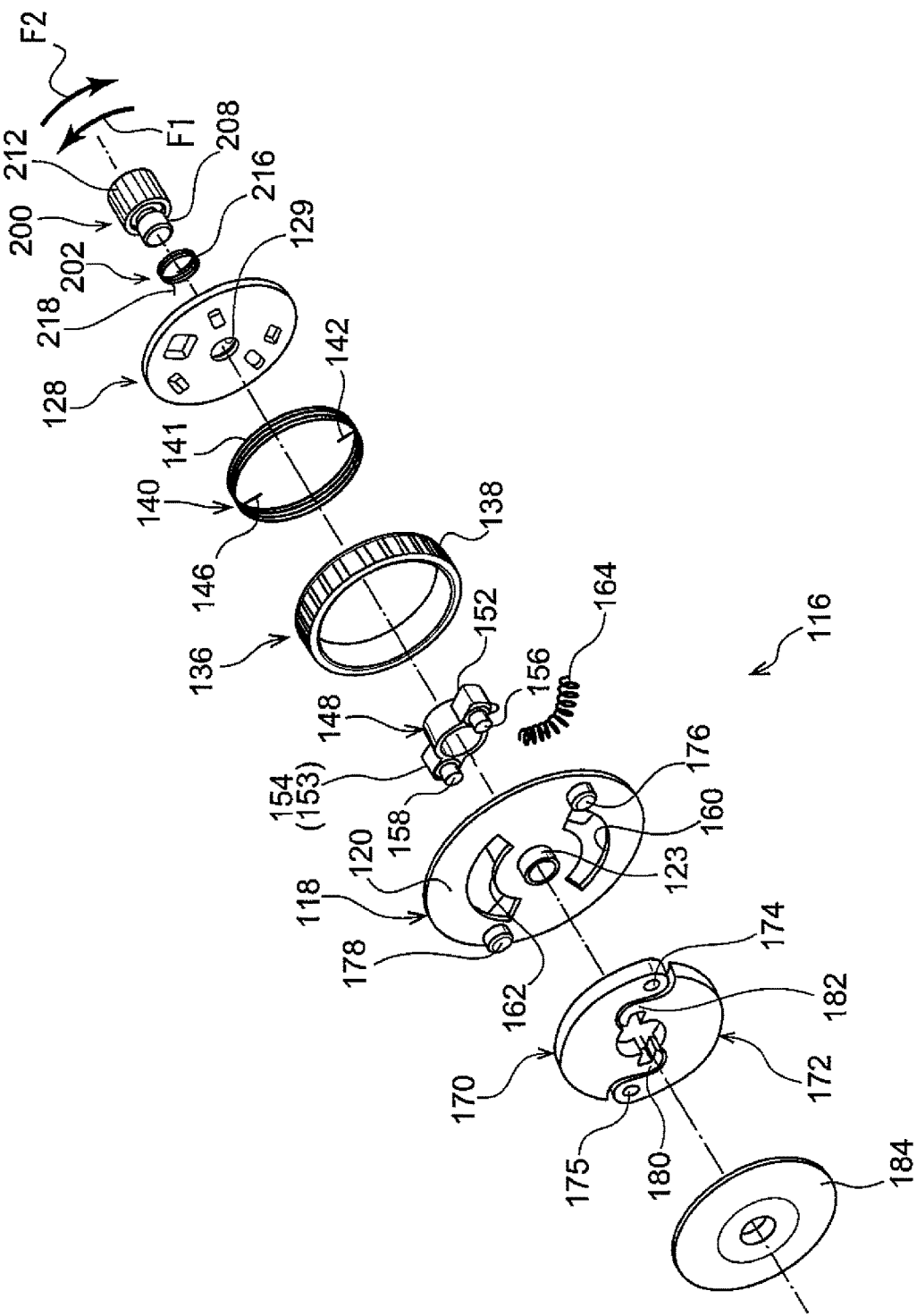
FIG. 7 is an exploded perspective view illustrating a second clutch, as viewed from the opposite side to FIG. 6.
Figure 8:
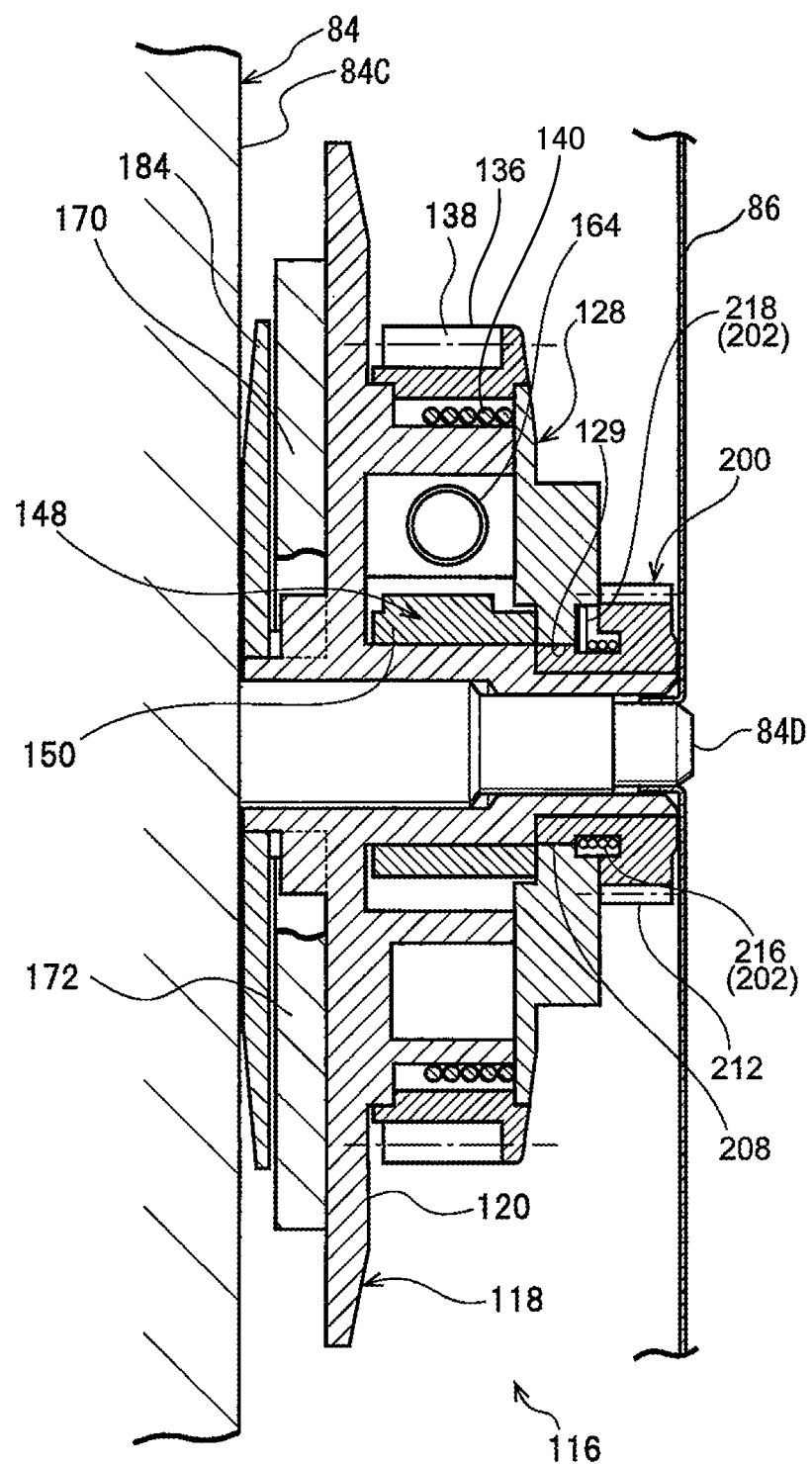
FIG. 8 is a cross-section taken along an axial direction of a second clutch.

FIG. 6 and FIG. 7 are exploded perspective views illustrating configuration of the second clutch 116, serving as a clutch. FIG. 8 illustrates configuration of the second clutch 116 in cross-section. As illustrated in FIG. 6 to FIG. 8, the second clutch 116 includes a base 118 and a rotor plate 128 that is attached to the base 118 so as to rotate as a unit together with the base 118. The second clutch 116 also includes a clutch gear 136, a clutch spring 140 provided between the base 118 and the clutch gear 136, and a lever 148 rotatably supported by the base 118. The second clutch 116 also includes a pair of clutch weights 170, 172 supported by the base 118, and a spacer 184 attached to the base 118.

The base 118 includes a circular disk portion 120 formed in a circular disk shape, a circular column shaped support shaft portion 122 projecting toward one axial direction side of the circular disk portion 120 at an axial center portion of the circular disk portion 120, and a side wall portion 124 with a substantially C-shaped cross-section formed coaxially around the support shaft portion 122. The base 118 also includes a block shaped first spring anchor portion 125 that is formed with a first spring anchor groove 125A to which an end portion of one side of the clutch spring 140 is anchored, and that projects out in the same direction as the projection direction of the support shaft portion 122. A radial direction outside face of the first spring anchor portion 125 is formed with a circular cylinder face shape with the same radius of curvature as an outer peripheral face of the side wall portion 124.

Figure 9A:
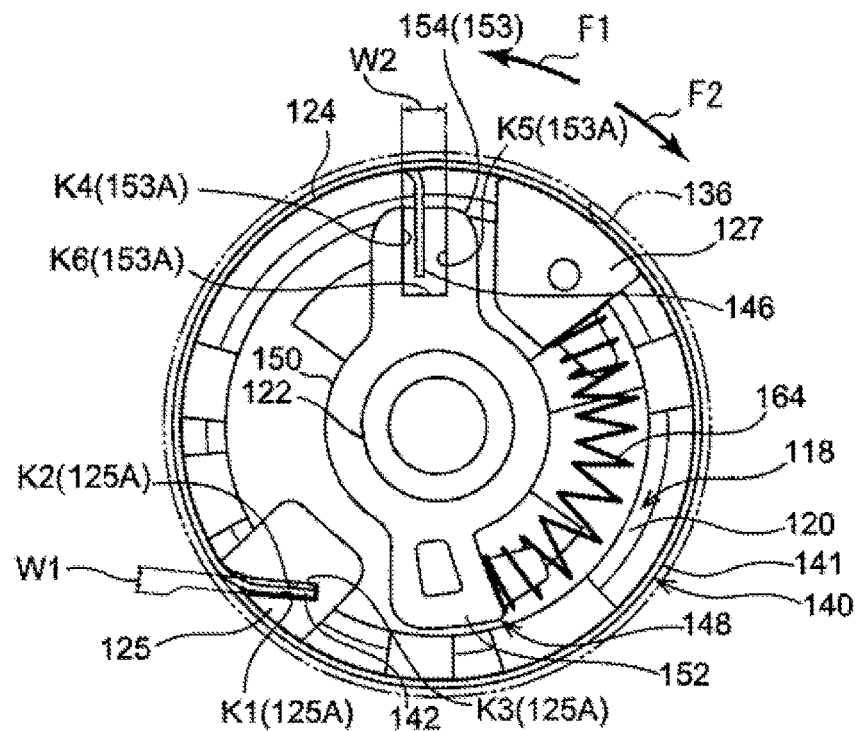
FIGS. 9A and 9B illustrate a partial configuration of a second clutch.

As illustrated in FIG. 9A, the first spring anchor groove 125A formed in the first spring anchor portion 125 is formed in a groove shape opening at the radial direction outside and on one axial direction side (the rotor plate 128 side) of the base 118. The first spring anchor groove 125A is configured including side wall portions K1, K2 disposed parallel to each other with a separation therebetween, and a bottom wall portion K3 forming a terminal face in a depth direction of the first spring anchor groove 125A. As viewed along the axial direction of the base 118, the side wall portions K1, K2 are inclined toward the radial direction inside of the base 118 on progression toward another (arrow F1 direction) side about the axis of the base 118. A groove width W1 of the first spring anchor groove 125A, namely, a clearance between the side wall portion K1 and the side wall portion K2, is set to a width slightly larger than the wire diameter of a first anchor portion 142 of the clutch spring 140, described later. Note that an open end of the first spring anchor groove 125A on the one axial direction side of the base 118 is closed off by the rotor plate 128, described later.

As illustrated in FIG. 6 and FIG. 7, the base 118 includes a circular cylinder shaped support shaft portion 123 projecting toward the opposite side of the circular disk portion 120 to the side provided with the support shaft portion 122. At the radial direction outside of the support shaft portion 123, the circular disk portion 120 of the base 118 also includes support shafts 176, 178 projecting out toward the side of the clutch weights 170, 172. The support shafts 176, 178 are disposed at uniform intervals around the circumferential direction of the base 118. A pair of elongated holes 160, 162 is formed around the circumferential direction of the base 118, at locations at the radial direction outside of the support shaft portions 122, 123 on the circular disk portion 120 of the base 118. Coupling projections 156, 158 of the lever 148, described later, engage with the elongated holes 160, 162, and the coupling projections 156, 158 are capable of moving about the circumferential direction of the circular disk portion 120 within the respective elongated holes 160, 162. An anchor wall 127 that abuts one end portion of a return spring 164, described later, stands out from the circular disk portion 120.

As illustrated in FIG. 8, the base 118 described above is disposed inside a housing recess 84C formed in the spring holder 84 and is rotatably supported by a shaft portion 84D standing out in the housing recess 84C.

As illustrated in FIG. 6 and FIG. 7, the rotor plate 128 formed in a circular disk shape is provided on one axial direction end side (the right side in FIG. 6 and FIG. 7) of the support shaft portion 122 of the base 118. The rotor plate 128 is engaged with a claw provided to the side wall portion 124 of the base 118 such that the rotor plate 128 is fixed so as to be capable of rotating as a unit together with the base 118. A circular shaft support hole 129 is formed at an axial center portion of the rotor plate 128, and an input gear 200, described later, is rotatably supported by the shaft support hole 129. The rotor plate 128 is rotated, namely the second clutch 116 is rotated, by inputting rotation force of the input gear 200, described later, to the rotor plate 128 through a sub clutch spring 202.

At the base 118 at the radial direction outside of the side wall portion 124, the clutch gear 136 is provided coaxially to, and capable of rotating relative to, the base 118. Plural outer teeth 138 are formed on an outer peripheral portion of the clutch gear 136. The outer teeth 138 mesh together with the outer teeth 79 (see FIG. 1) of the idle gear 78 described above. An internal diameter dimension of the clutch gear 136 is sufficiently larger than an external diameter dimension of the side wall portion 124 of the base 118, and a ring shaped gap is formed between an inner peripheral face of the clutch gear 136 and the outer peripheral face of the side wall portion 124. The clutch spring 140, configured by a torsion coil spring, is disposed coaxially in the ring shaped gap.

The clutch spring 140 includes a coil portion 141 that is coiled into a ring shape between the outer peripheral face of the side wall portion 124 of the base 118 and the inner peripheral face of the clutch gear 136. An end portion on the one side of the clutch spring 140 is bent toward the radial direction inside of the coil portion 141 to configure the first anchor portion 142. As illustrated in FIG. 9A, the first anchor portion 142 has an incline with respect to the radial direction of the coil portion 141 corresponding to that of the first spring anchor groove 125A described above. An end portion on another side of the clutch spring 140 is bent toward the radial direction inside of the coil portion 141 to configure a second anchor portion 146. The second anchor portion 146 extends along the radial direction of the coil portion 141 corresponding to a second spring anchor groove 153A formed in the lever 148, described later. The first anchor portion 142 and the second anchor portion 146 are disposed at a predetermined separation from each other around the circumferential direction of the coil portion 141. An internal diameter dimension of the coil portion 141 in a natural state is set as a smaller dimension than an external diameter dimension of the side wall portion 124 of the base 118. The coil portion 141 is accordingly urged in a direction to decrease in diameter under its own elastic force when the coil portion 141 is assembled the side wall portion 124 of the base 118. The coil portion 141 is accordingly in close contact with the outer peripheral face of the side wall portion 124 of the base 118 in an assembled state of the coil portion 141 to the side wall portion 124 of the base 118. A clearance is provided between the coil portion 141 and the inner peripheral face of the clutch gear 136 in the assembled state of the coil portion 141 to the side wall portion 124 of the base 118.

The first anchor portion 142 of the clutch spring 140 is fitted into and anchored by the first spring anchor groove 125A formed in the first spring anchor portion 125 of the base 118. Moreover, the second anchor portion 146 of the clutch spring 140 is fitted into and anchored by the second spring anchor groove 153A formed in a second spring anchor portion 153 of the lever 148, described later.

The lever 148 includes a circular cylinder shaped shaft bearing portion 150. The support shaft portion 122 of the base 118 passes through inside the tube of the shaft bearing portion 150, thereby supporting the lever 148 so as to be capable of rotating relative to and about the axis of the support shaft portion 122 (base 118). An outer peripheral portion of the shaft bearing portion 150 is provided with a coupling portion 152 and a coupling portion 154 in a pair projecting out along the radial direction at opposite sides to each other around the circumferential direction (opposite sides at 180° to each other).

As illustrated in FIG. 7, the circular column shaped coupling projection 156 and coupling projection 158 are provided projecting out from the pair of respective coupling portions 152, 154 toward the circular disk portion 120 side of the base 118. The coupling projections 156, 158 respectively engage with engagement pawls 180, 182 provided to the pair of the clutch weight 170 and the clutch weight 172, described later.

Figure 9B:
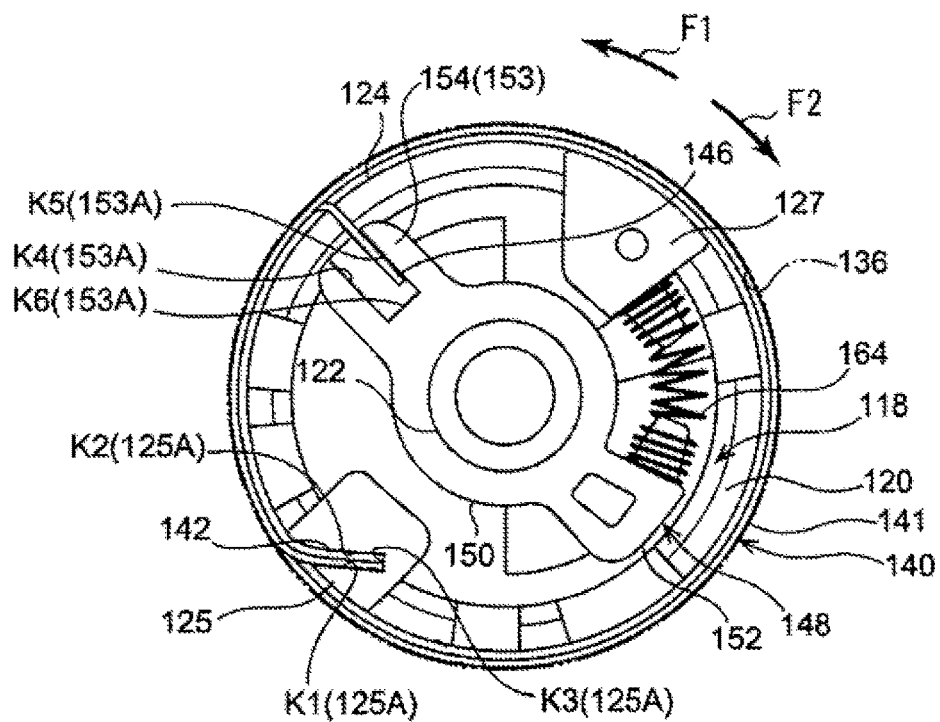

As illustrated in FIG. 9A and FIG. 9B, the one coupling portion 152 of the lever 148 is abutted by one end portion of the return spring 164, this being a torsion coil spring. Another end portion of the return spring 164 abuts the anchor wall 127 standing out from the circular disk portion 120 of the base 118. The return spring 164 places the lever 148 under a constant urging in one direction about the axis of the base 118 (the arrow F2 direction). The pair of coupling projections 156, 158 of the lever 148 is normally retained in a state abutting one longitudinal direction end portion (arrow F2 direction side end portions in FIG. 5 and FIG. 6) of each of the pair of elongated holes 160, 162 of the circular disk portion 120.

As illustrated in FIG. 9A, the other coupling portion 154 of the lever 148 is configured as the second spring anchor portion 153 to which the second anchor portion 146 of the clutch spring 140 is anchored. The second spring anchor portion 153 is formed with the second spring anchor groove 153A into which the second anchor portion 146 of the clutch spring 140 is fitted. Accordingly, as illustrated in FIG. 9A and FIG. 9B, when the lever 148 rotates toward the another direction (the arrow F1 direction) about the axis with respect to the base 118 against the elastic force of the return spring 164, the second anchor portion 146 of the clutch spring 140 is moved toward one coil direction of the clutch spring 140 (the arrow F1 direction), enlarging the external diameter dimension of the coil portion 141 of the clutch spring 140. The second spring anchor groove 153A is configured including side wall portions K4, K5 and a bottom wall portion K6, similarly to the first spring anchor groove 125A described above. In the present exemplary embodiment, in a state in which the lever 148 is supported by the base 118, the side wall portions K4, K5 are substantially parallel to the radial direction of the base 118. A groove width W2 of the second spring anchor groove 153A, namely a clearance between the side wall portion K4 and the side wall portion K5, is set as a width sufficiently wider than the wire diameter of the second anchor portion 146 of the clutch spring 140. The clutch spring 140 accordingly has good ease of assembly to the base 118 and the lever 148.

Moreover, when the external diameter dimension of the coil portion 141 of the clutch spring 140 is enlarged in this manner, the coil portion 141 of the clutch spring 140 presses against the inner peripheral face of the clutch gear 136. In this state, a predetermined frictional force arises between an outer peripheral portion of the clutch spring 140 and the inner peripheral face of the clutch gear 136, such that the frictional force couples the clutch spring 140 and the clutch gear 136 integrally to one another.

As illustrated in FIG. 6 to FIG. 8, the pair of the clutch weight 170 and the clutch weight 172 that are respectively formed in substantially semicircular plate shapes are disposed on another axial direction side of the base 118 (the opposite side to the rotor plate 128). The pair of clutch weights 170, 172 are set with the same weight as each other, and are provided on opposite sides to each other around the circumferential direction of the circular disk portion 120 (on opposite sides at 180° to each other). Circular shaft bearing holes 174, 175 are formed in one respective circumferential direction sides of the pair of clutch weights 170, 172. The circular column shaped support shaft 176 and support shaft 178 projecting out from the circular disk portion 120 of the base 118 fit rotatably into the respective shaft bearing holes 174, 175. The respective clutch weights 170, 172 are thereby supported by the base 118 so as to be rotatable (capable of tilting) about the respective support shafts 176, 178 (shaft bearing holes 174, 175) in the radial direction of the base 118.

The one clutch weight 170 includes the substantially U-shaped engagement pawl 180 that engages with the coupling projection 158 of the lever 148 described above. The other clutch weight 172 likewise includes the substantially U-shaped engagement pawl 182 that engages with the coupling projection 156 of the lever 148. The pair of the clutch weight 170 and the clutch weight 172 are thereby synchronized (coupled) through the lever 148, and are normally retained at the radial direction inside of the base 118 under the urging force of the return spring 164 acting on the lever 148.

As illustrated in FIG. 6 to FIG. 8, the circular disk shaped spacer 184 is disposed on the opposite side of the pair of clutch weights 170, 172 to the base 118. A tube shaped boss portion 184A that fits together with an outer peripheral portion of the support shaft portion 123 of the base 118 stands out from a central portion of the spacer 184. The spacer 184 suppresses the pair of clutch weights 170, 172 from falling off the base 118, and also suppresses the pair of the clutch weight 170 and the clutch weight 172 from impinging on a bottom wall of the housing recess 84C of the spring holder 84.

Note that in the second clutch 116 of the present exemplary embodiment, when the rotor plate 128 rotates toward the another direction (the arrow F1 direction in FIG. 6 and FIG. 7) about its axis, the base 118 that is coupled integrally to the rotor plate 128 rotates toward the another direction about its axis together with the rotor plate 128. Accordingly, the pair of the clutch weight 170 and the clutch weight 172 supported by the base 118 rotate about the axis of the base 118 following the base 118. When this occurs, centrifugal force acts on the pair of the clutch weight 170 and the clutch weight 172, such that rotation torque acts on the clutch weight 170 about the support shaft 176 and rotation torque acts on the clutch weight 172 about the support shaft 178.

Accordingly, when the magnitudes of the rotation torques are at a predetermined value or greater, namely, when the rotation speeds of the pair of clutch weight 170 and the clutch weight 172 are at a predetermined value or greater, the pair of the clutch weight 170 and the clutch weight 172 respectively rotate about the support shaft 176 or the support shaft 178 toward the radial direction outside of the base 118 against the urging force of the return spring 164 acting on the lever 148. Accordingly, configuration is made such that the lever 148, in which the coupling projection 158 is engaged with the engagement pawl 180 of the clutch weight 170, and in which the coupling projection 156 is engaged with the engagement pawl 182 of the clutch weight 172, rotates toward the another direction (the arrow F1 direction in FIG. 9A and FIG. 9B) about the axis with respect to the base 118.

In the present exemplary embodiment, configuration is made such that rotation force of the output shaft of the motor 38 is transmitted to the rotor plate 128 through the A-gear 40, the B-gear 46, the OL-gear 48, the input gear 200 serving as a first rotating body, and the sub clutch spring 202 serving as a sub clutch.

Figure 10:
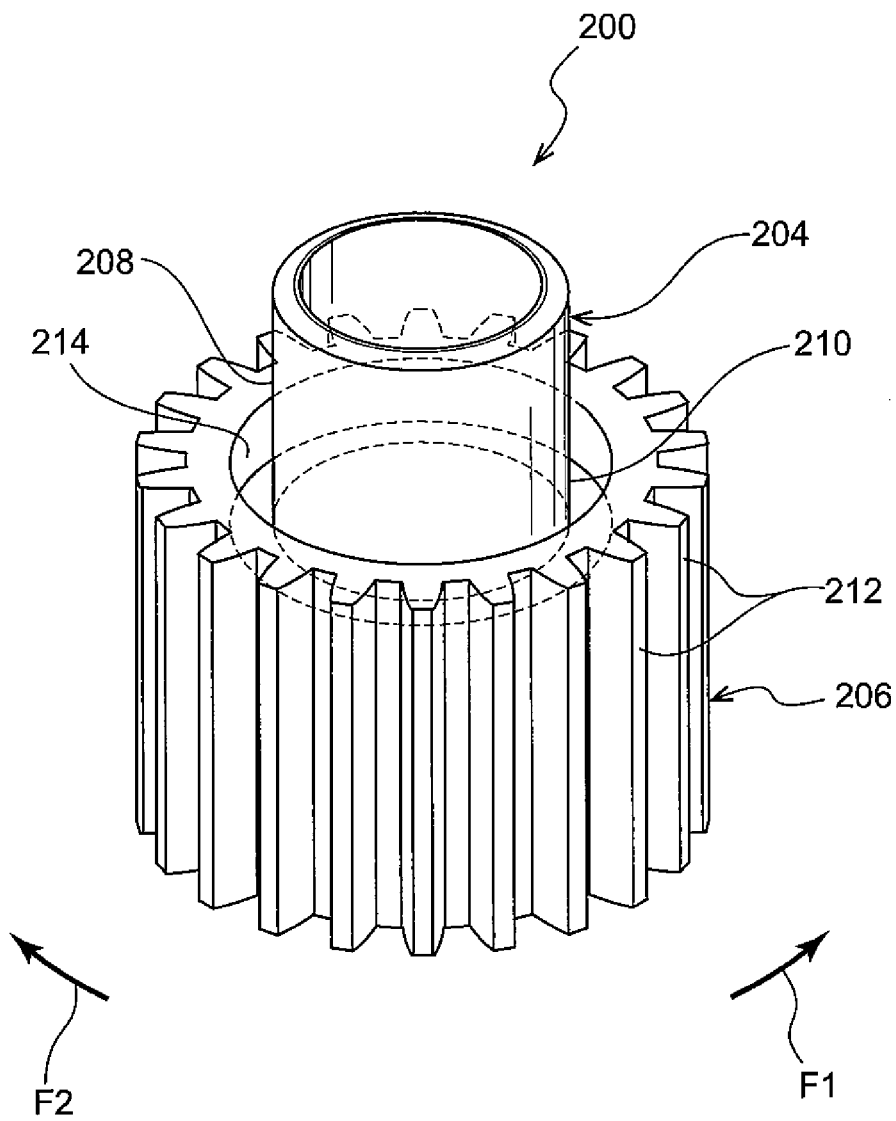
FIG. 10 is an enlarged perspective view illustrating an input gear.

As illustrated in FIG. 10, the input gear 200 is configured including a shaft portion 204 that is rotatably supported by the shaft support hole 129 (see FIG. 6) of the rotor plate 128, and a gear portion 206 that is integrally provided to the shaft portion 204. The shaft portion 204 is formed in a substantially circular cylinder shape, and an end portion on the rotor plate 128 side of the shaft portion 204 configures an engagement portion 208 that engages with the shaft support hole 129 of the rotor plate 128. A portion of the shaft portion 204 on the opposite side to the rotor plate 128 configures a sub clutch spring setting portion 210 where the sub clutch spring 202 (see FIG. 6) is disposed around an outer peripheral face of the shaft portion 204. The sub clutch spring 202, described later, is pressed onto the sub clutch spring setting portion 210, such that the input gear 200 and the sub clutch spring 202 rotate together as a unit. The gear portion 206 is provided at an end portion on one side of the shaft portion 204, and an outer peripheral portion of the gear portion 206 is formed with outer teeth 212 of a spur gear. The outer teeth 212 mesh together with the outer teeth 69 (see FIG. 4) of the input gear 68 configuring part of the OL-gear 48, described above. A radial direction inside of an end portion on the rotor plate 128 (see FIG. 7) side of the gear portion 206 is formed with a housing recess 214 in which part of the sub clutch spring 202, described later, is disposed.

Figure 11:
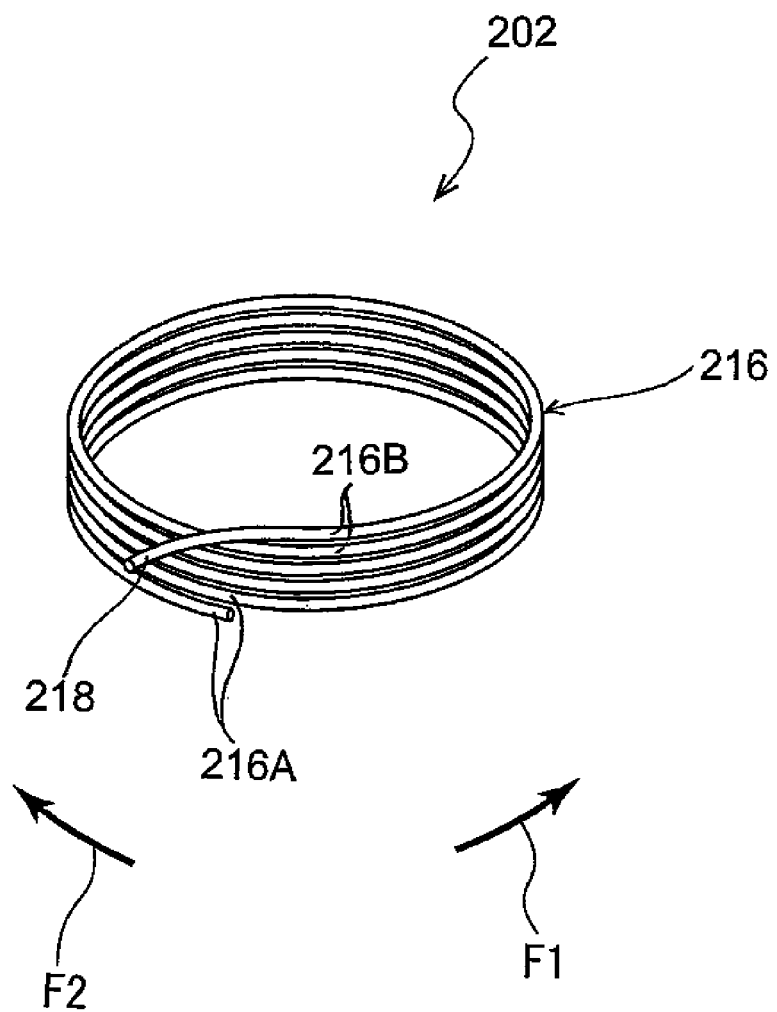
FIG. 11 is an enlarged perspective view illustrating a sub clutch spring.
Figure 12:
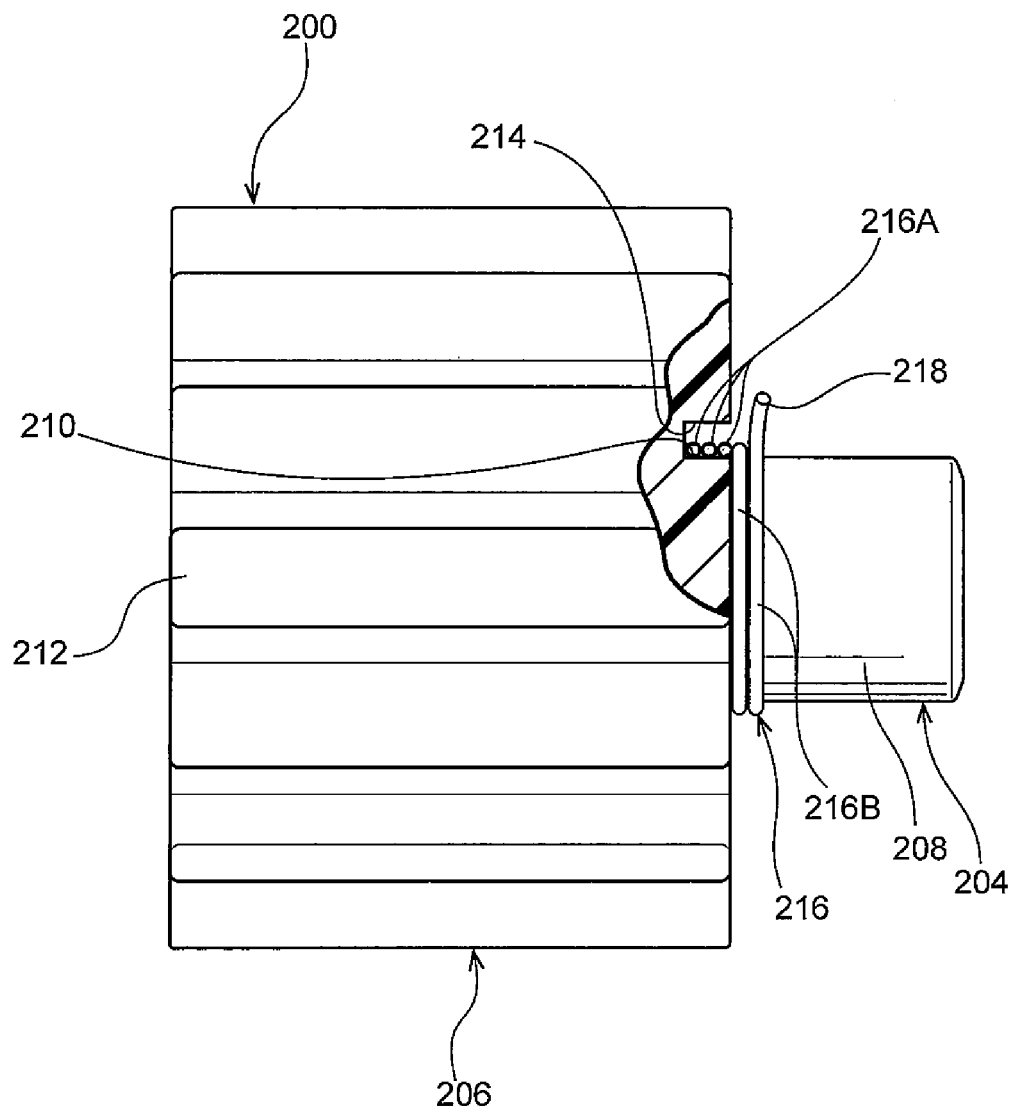
FIG. 12 is an enlarged side view illustrating an assembled state of a sub clutch spring to an input gear.

As illustrated in FIG. 6, the sub clutch spring 202 is provided between the input gear 200 and the rotor plate 128. The sub clutch spring 202 is formed by, for example, bending a wire shaped member. As illustrated in FIG. 11, the sub clutch spring 202 includes a coil portion 216 that is coiled in a ring shape around an outer peripheral face of the sub clutch spring setting portion 210 (see FIG. 10) of the input gear 200. An end portion of the sub clutch spring 202 on the rotor plate 128 (see FIG. 6) side configures an anchor portion 218 that is bent around toward the radial direction outside of the coil portion 216. The coil portion 216 is formed by coiling a wire shaped member into a helical shape toward the other side about its axis (in the arrow F1 direction) as viewed from the opposite side of the coil portion 216 to the side where the anchor portion 218 is formed. In a natural state, an internal diameter dimension of the coil portion 216 is set as a smaller dimension than, or the same dimension as, an external diameter dimension of the sub clutch spring setting portion 210. Accordingly, as illustrated in FIG. 12, in an assembled state of the sub clutch spring 202 to the sub clutch spring setting portion 210, the coil portion 216 contacts the outer peripheral face of the sub clutch spring setting portion 210. Moreover, in the assembled state of the sub clutch spring 202 to the sub clutch spring setting portion 210, a portion 216A of the coil portion 216 on the opposite side to the side where the anchor portion 218 is provided is disposed inside the housing recess 214 formed to the gear portion 206 of the input gear 200. A side 216B of the coil portion 216 where the anchor portion 218 is provided is disposed further to the rotor plate 128 side than an open end of the housing recess 214.

Figure 13:
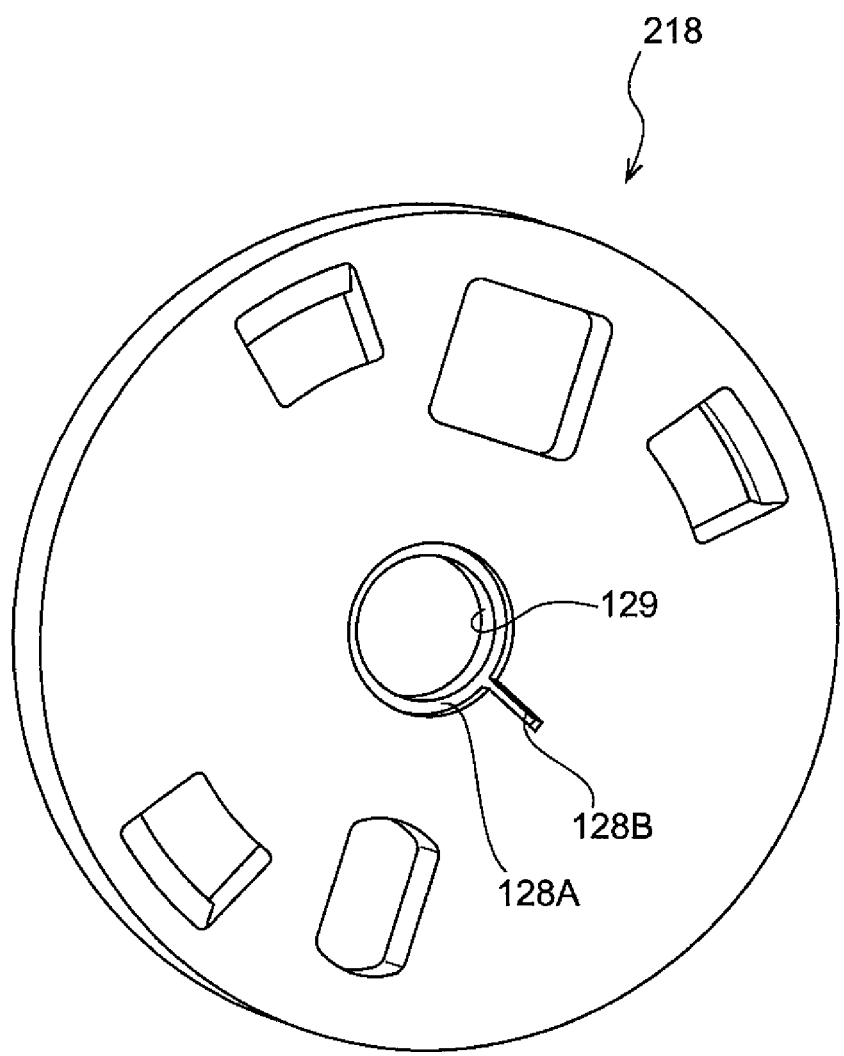
FIG. 13 is an enlarged perspective view illustrating a rotor plate.

As illustrated in FIG. 13, an inner peripheral edge portion of the shaft support hole 129 of the rotor plate 128 is formed with a step portion 128A where a portion 216B (see FIG. 12) of the coil portion 216 of the sub clutch spring 202 disposed further to the rotor plate 128 side than the open end of the housing recess 214 is disposed. The rotor plate 128 is formed with an anchor groove 128B that is connected to the step portion 128A and to which the anchor portion 218 (see FIG. 12) of the sub clutch spring 202 is anchored.

As illustrated in FIG. 6, FIG. 11, and FIG. 12, when the input gear 200 is rotated toward the another side about its axis (in the arrow F1 direction), the external diameter of the coil portion 216 decreases due to frictional force between the sub clutch spring setting portion 210 of the input gear 200 and the coil portion 216 of the sub clutch spring 202. The coil portion 216 accordingly closely contacts the sub clutch spring setting portion 210, such that the input gear 200 is rotated toward the another side about its axis (in the arrow F1 direction) together with the sub clutch spring 202. As a result, rotation force of the input gear 200 toward the another side about its axis (in the arrow F1 direction) is transmitted to the rotor plate 128 through the sub clutch spring 202, and the second clutch 116 is rotated toward the other side about its axis (in the arrow F1 direction).

When the input gear 200 is rotated toward the one side about its axis (in the arrow F2 direction), the external diameter of the coil portion 216 enlarges due to frictional force between the sub clutch spring setting portion 210 of the input gear 200 and the coil portion 216 of the sub clutch spring 202. The sub clutch spring setting portion 210 accordingly spins freely with respect to the coil portion 216. As a result, the transmission of rotation force of the input gear 200 toward the one side about its axis (in the arrow F2 direction) to the rotor plate 128 is shut off, and the second clutch 116 is not rotated toward the one side about its axis (in the arrow F2 direction).

Next, explanation follows regarding actions when taking up webbing, using the actions of the webbing take-up device 10 configured as described above as an example.

In the webbing take-up device 10, when the occupant stops the vehicle and releases a tongue plate from the buckle device, the spool 20 rotates in the take-up direction under the urging force of the retractor spring 82. However, since the urging force of the retractor spring 82 is set so as to be comparatively weak, the spool 20 rotates in the take-up direction with a comparatively weak rotation force, commensurate with the urging force of the retractor spring 82.

At this point, when release of the tongue plate is detected, a webbing take-up controlling device, described later, controls the motor 38 such that the output shaft of the motor 38 rotates in the reverse direction. The rotation of the output shaft of the motor 38 is then transmitted to the spool 20 through the transmission route illustrated in FIG. 14.

When the output shaft of the motor 38 is rotated in the reverse direction, the output shaft of the motor 38 rotates the A-gear 40 in the arrow A2 direction. When the A-gear 40 is rotated in the arrow A2 direction, the B-gear 46 is rotated in the arrow B2 direction by the A-gear 40, and the OL-gear 48 is rotated in the arrow C2 direction by the B-gear 46. Then, the input gear 200 is rotated in the arrow F1 direction by the OL-gear 48. When this occurs, as illustrated in FIG. 6 to FIG. 8, the rotation force of the input gear 200 is transmitted to the rotor plate 128 of the second clutch 116 through the sub clutch spring 202 and the rotor plate 128 is rotated in the arrow F1 direction together with the base 118.

The rotation of the base 118 is transmitted to the clutch weight 170 through the support shaft 176 and the shaft bearing hole 174, and is transmitted to the clutch weight 172 through the support shaft 178 and the shaft bearing hole 175, such that the clutch weight 170 and the clutch weight 172 rotate about the axis of the base 118 following the base 118. Accordingly, centrifugal force acts on the clutch weight 170 and the clutch weight 172. As a result, the clutch weight 170 and the clutch weight 172 rotate (tilt) toward the radial direction outside of the base 118 about the support shafts 176, 178 and against the urging force of the return spring 164 acting on the lever 148.

Accordingly, the lever 148 rotates toward the another direction about the axis (the arrow F1 direction in FIG. 9A and FIG. 9B) with respect to the base 118, with the coupling projection 158 engaged with the engagement pawl 180 of the clutch weight 170 and the coupling projection 156 engaged with the engagement pawl 182 of the clutch weight 172.

Figure 14:
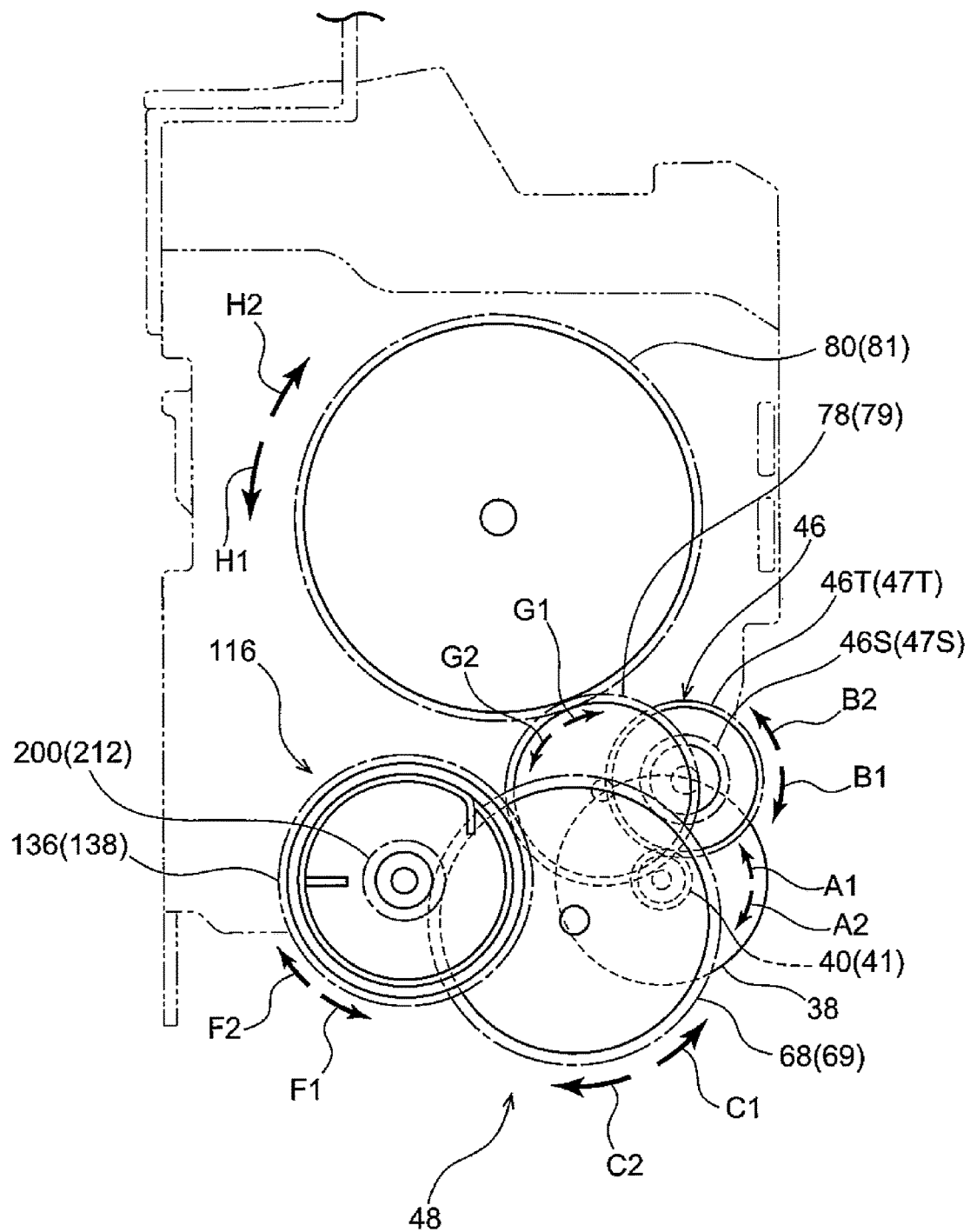
FIG. 14 is an explanatory diagram to explain a transmission route of rotation of an output shaft of a motor during take-up assist.

When the lever 148 rotates about the axis toward the other direction with respect to the base 118, the second anchor portion 146 of the clutch spring 140 is moved toward the one coil direction of the clutch spring 140 (the arrow F1 direction in FIG. 9A and FIG. 9B) by the lever 148. As a result, the external diameter dimension of the coil portion 141 of the clutch spring 140 is enlarged, placing the outer peripheral portion of the coil portion 141 of the clutch spring 140 in close contact with the inner peripheral face of the clutch gear 136. The second clutch 116 thereby enters an operational state, the rotation of the clutch spring 140 is transmitted to the clutch gear 136, and the clutch gear 136 rotates toward the arrow F2 direction. As illustrated in FIG. 14, the outer teeth 138 of the clutch gear 136 are meshed together with the outer teeth 79 of the idle gear 78, such that the idle gear 78 is rotated in the arrow G1 direction. The spool gear 80 is rotated in the arrow H1 direction by the idle gear 78, rotating the spool 20 in the take-up direction together with the spool gear 80. The rotation of the spool 20 makes up the insufficiency in the urging force of the retractor spring 82 to take up and store the webbing in a layered shape on the spool 20 (what is known as "take-up assist").

In the present exemplary embodiment, the webbing can easily be pulled out from the spool 20 even when performing the take-up assist described above. Namely, the spool 20 can easily be rotated in the pull-out direction against the torque of the take-up assist.

When the webbing has been fully taken up on the spool 20, the power supply to the motor 38 is cut off by the motor controller, stopping rotation of the output shaft of the motor 38.

When the rotation of the motor 38 stops, the clutch weight 170 and the clutch weight 172 rotate toward the radial direction inside of the base 118 under the elastic force of the clutch spring 140 and the elastic force of the return spring 164 acting on the lever 148. The clutch spring 140 accordingly returns once more to its natural state, and the outer peripheral portion of the coil portion 141 separates from the inner peripheral face of the clutch gear 136, immediately releasing the coupling between the clutch spring 140 and the clutch gear 136 described above. The coupling together of the spool 20 and the output shaft of the motor 38 through the second clutch 116 is thereby released, allowing the webbing taken up on the spool 20 to be pulled out again.

Figure 15:
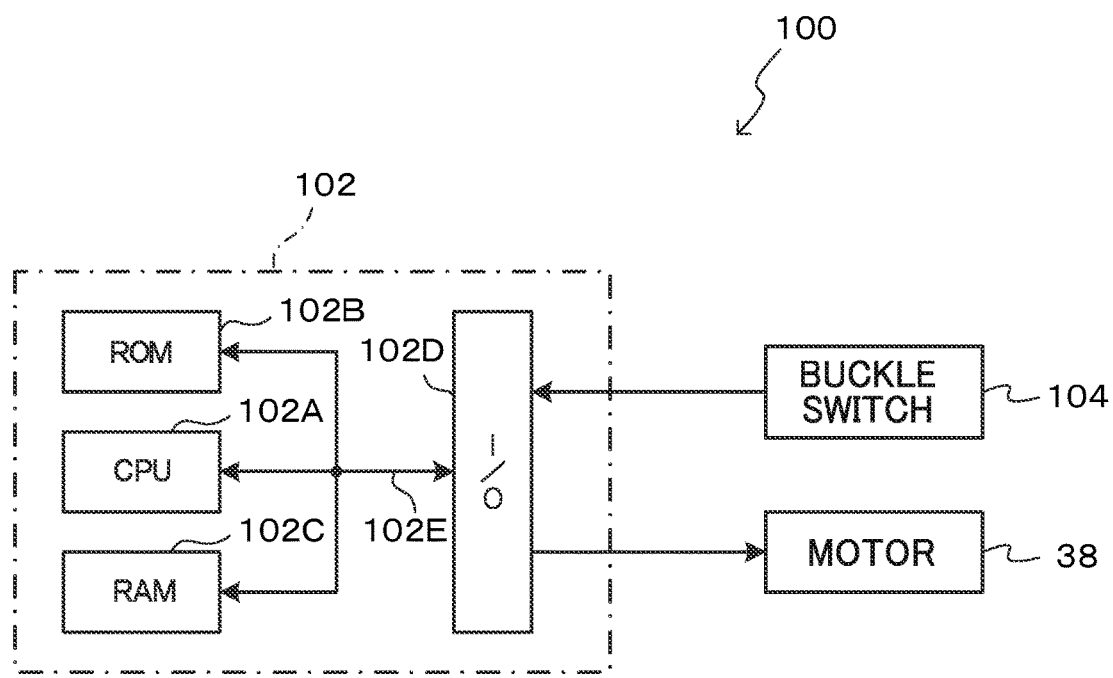
FIG. 15 is a block diagram illustrating configuration of a webbing take-up controlling device according to an exemplary embodiment.

Next, explanation follows regarding the webbing take-up controlling device according to the present exemplary embodiment. FIG. 15 is a block diagram illustrating configuration of a webbing take-up controlling device according to the present exemplary embodiment.

A webbing take-up controlling device 100 includes a controller 102 that controls rotation of the motor 38 described above.

The controller 102 is configured by a computer in which a CPU 102A, ROM 102B, RAM 102C, and an I/O (input/output interface) 102D are connected to a bus 102E.

A program for controlling the motor 38 is stored in the ROM 102B. The program stored in the ROM 102B is expanded into the RAM 102C and executed by the CPU 102A to control the motor 38.

A buckle switch 104 and the motor 38 that is able to operate the second clutch 116 are connected to the I/O 102D. Signals from the buckle switch 104 are input into the controller 102, and control signals for the motor 38 can be output from the controller 102.

The buckle switch 104 is a switch provided to a buckle into which a tongue plate is inserted. The buckle switch 104 detects insertion and removal of the tongue plate into and out of the buckle and outputs a detection result to the controller 102.

In the present exemplary embodiment, the controller 102 controls operation of the motor 38 based on a signal from the buckle switch 104 to drive the motor 38 when the tongue plate has been released from the buckle. The motor 38 is then driven to operate the second clutch 116 described above and perform take-up assist for the webbing.

The webbing take-up device 10 configured as described above utilizes what is known as a centrifugal clutch, which operates due to centrifugal force acting on the clutch weights 170, 172 of the second clutch 116. In a centrifugal clutch, inertial force acts in addition to centrifugal force during operation, thus the load at an early stage of operation is larger than the load after operation, and so durability is an issue. Moreover, the sound of operation is also louder due to the increased load at an early stage of operation of the second clutch 116.

In order to reduce load during operation of the second clutch 116, the webbing take-up controlling device 100 according to the present exemplary embodiment applies a voltage to the motor 38 that is lower than a target voltage that produces the centrifugal force to operate the second clutch 116, and then applies the target voltage to the motor 38.

Figure 16A:
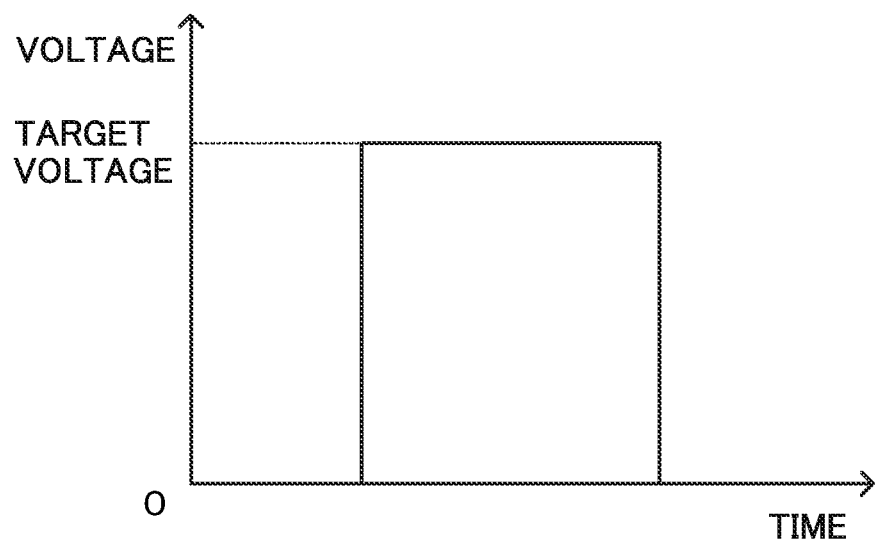
FIG. 16A is a diagram illustrating voltage application to a conventional motor.
Figure 16B:
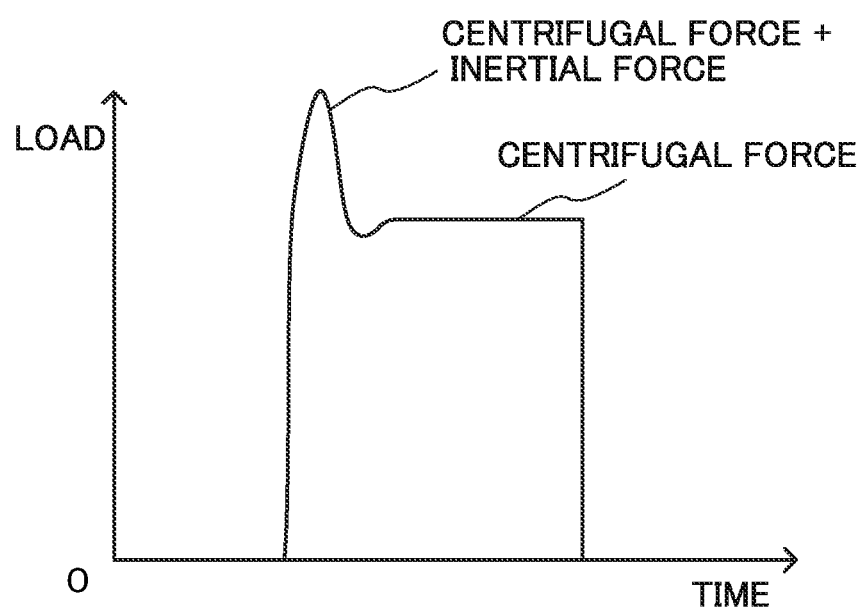
FIG. 16B is a diagram illustrating load arising at a second clutch when the voltage of FIG. 16A is applied.

Hitherto, as illustrated in FIG. 16A, a target voltage was applied to control operation of the second clutch 116. In such a case, as illustrated in FIG. 16B, at the start of application of the target voltage, in addition to centrifugal force, inertial force also acts on the clutch weights 170, 172 of the second clutch 116, thus producing a load greater than the centrifugal force at which the second clutch 116 operates.

Figure 17A:
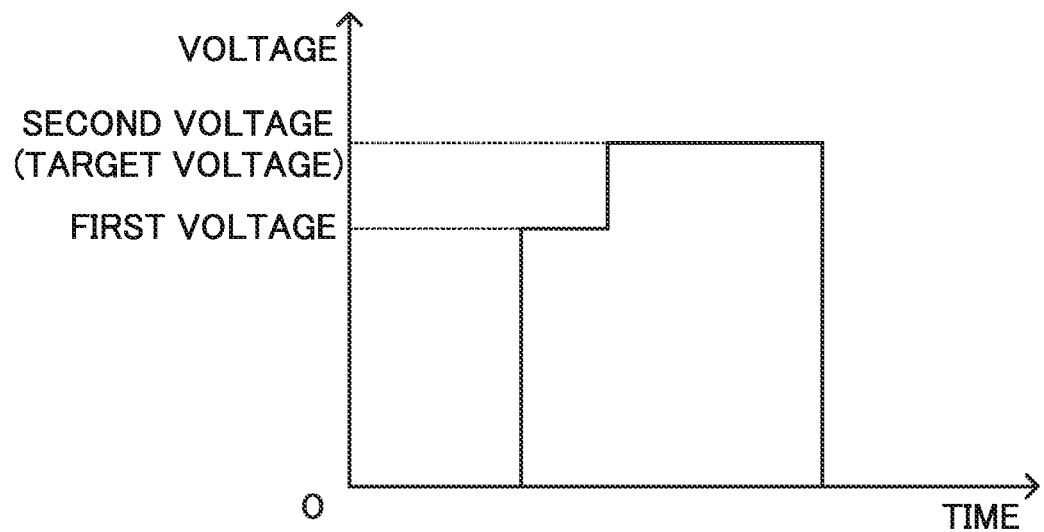
FIG. 17A is a diagram illustrating voltage application by a webbing take-up controlling device according to an exemplary embodiment.
Figure 17B:
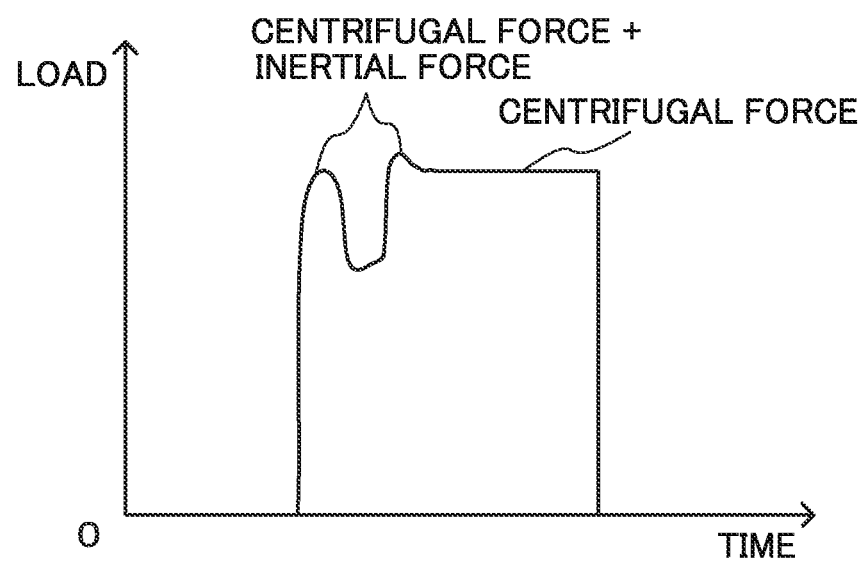
FIG. 17B is a diagram illustrating load arising at a second clutch when the voltage of FIG. 17A is applied.

In contrast thereto, in the present exemplary embodiment, as illustrated in FIG. 17A, a first voltage that is lower than the target voltage is applied to the motor 38, and then a second voltage, this being the target voltage to operates the second clutch 116, is applied to the motor 38. Specifically, a first voltage that is smaller than the target voltage and at which the combined load of centrifugal force and inertial force acting on the clutch weights 170, 172 of the second clutch 116 produces a load exceeding the centrifugal force at which the second clutch 116 operates is applied. Then, the second voltage, at which the centrifugal force acting on the second clutch 116 becomes the centrifugal force of the second clutch 116, is applied. Namely, by applying a first voltage that is lower than the target voltage to the motor, the load (the combined load of the centrifugal force and the inertial force) acting on the second clutch 116 can be reduced compared to the case in which the target voltage is applied from the start. Thus, as illustrated in FIG. 17B, the load acting on the second clutch 116 is distributed, and a load greater than the centrifugal force necessary to operate the second clutch 116 is prevented from arising. Additionally, applying a second voltage (the target voltage) after applying the first voltage enables the inertial force when applying the second voltage (the target voltage) to be reduced compared to hitherto, and enables a load greater than necessary to be prevented from arising at the second clutch 116.

Figure 18:
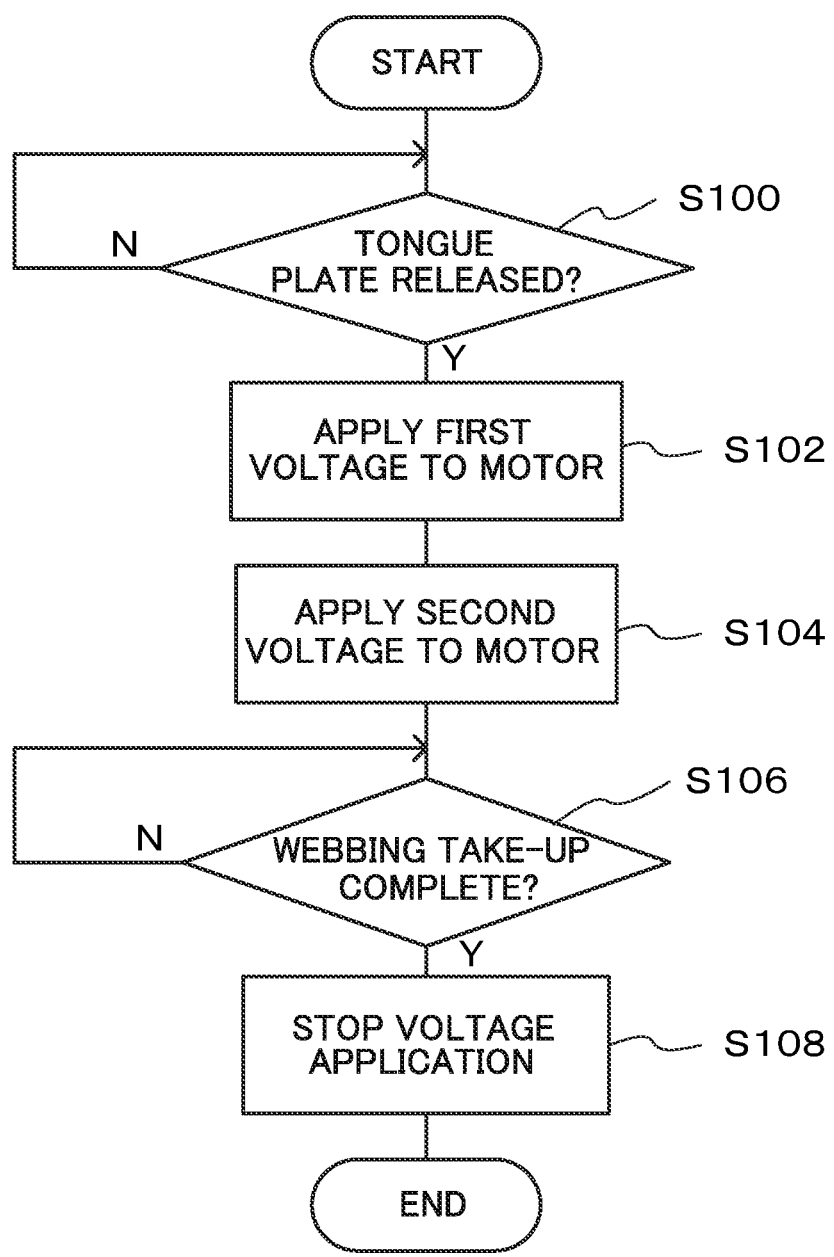
FIG. 18 is a flowchart illustrating an example flow of specific processing performed by a controller of a webbing take-up controlling device according to an exemplary embodiment.

Explanation follows regarding specific processing performed by the controller 102 of the webbing take-up controlling device 100 according to the present exemplary embodiment. FIG. 18 is a flowchart illustrating an example flow of specific processing performed by the controller 102 of the webbing take-up controlling device 100 according to the present exemplary embodiment. Note that the processing of FIG. 18 begins when the webbing is worn and insertion of the tongue plate into the buckle has been detected by the buckle switch 104.

At step S100, the controller 102 determines whether or not release of the tongue plate has been detected. This determination is made based on a signal from the buckle switch 104. Processing stands by until an affirmative determination is made, at which point processing transitions to step S102.

At step S102, the controller 102 applies the first voltage to the motor 38. Then, processing transitions to step S104. Namely, the first voltage is applied to the motor 38 such that the centrifugal force and the inertial force acting on the clutch weights 170, 172 of the second clutch 116 become the centrifugal force to operate the second clutch 116, thus operating the second clutch 116.

At step S104, the controller 102 applies the second voltage to the motor 38. Then, processing transitions to step S106. By applying the second voltage to the motor 38, the centrifugal force to operate the second clutch 116 acts on the clutch weights 170, 172 of the second clutch 116. The second clutch 116 thereby enters the operational state, and the webbing is taken up by rotation of the motor 38. Thus, applying the first voltage to the motor 38 and then applying the second voltage to the motor 38 distributes the load acting on the second clutch 116, and enables a load greater than the centrifugal force necessary to operate the second clutch 116 to be prevented from arising. Note that depending on the time from application of the first voltage to application of the second voltage, the second clutch 116 may momentarily stop operating and then start operating once more. However, by applying the first voltage and then applying the second voltage, the advantageous effect of being able to distribute the load acting on the second clutch 116 can be obtained.

At step S106, the controller 102 determines whether or not take up of the webbing has been completed. This determination may determine whether or not a load on the motor 38 is a predetermined value or greater, whether or not the stop of rotation has been detected by a sensor that detects the rotation of the spool 20 taking up the webbing, or the like. Processing stands by until an affirmative determination is made, at which point processing transitions to step S108.

At step S108, the controller 102 stops the application of voltage to the motor 38 and ends the processing sequence.

Thus, in the present exemplary embodiment, by applying, to the motor 38, a voltage that is lower than a target voltage that produces the centrifugal force to operate the second clutch 116, and then applying the target voltage, load acting on the second clutch 116 is distributed, and a greater-than-necessary load is prevented from arising. This enables the durability of the second clutch 116 to be improved, and the sound of operation of the second clutch 116 to be reduced.

Note that in the exemplary embodiment described above, although explanation was given using an example in which the first voltage is a voltage of a magnitude to operate the second clutch 116, the first voltage is not limited thereto. For example, configuration may be such that the first voltage is a voltage at which the second clutch 116 does not operate, and the second clutch 116 is operated when the second voltage is applied after application of the first voltage. Even with this configuration, due to the presence of the first voltage, the inertial force acting on the second clutch 116 is able to be distributed, enabling the inertial force when the target voltage is applied after application of the first voltage to be reduced compared to hitherto, and enabling greater-than-necessary load to be prevented from arising.

Figure 19A:
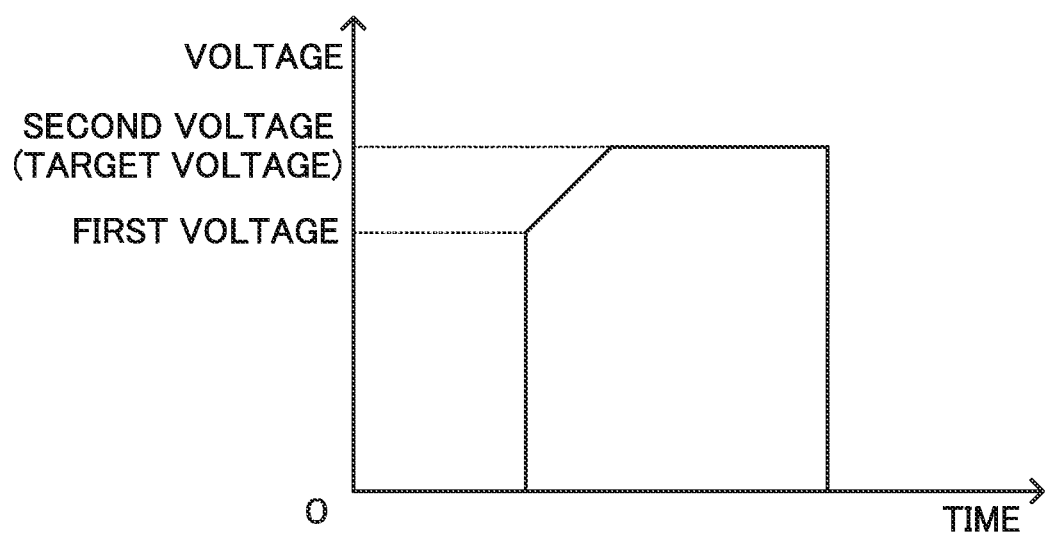
FIG. 19A is a diagram illustrating a first modified example of voltage application by a webbing take-up controlling device according to an exemplary embodiment.
Figure 19B:
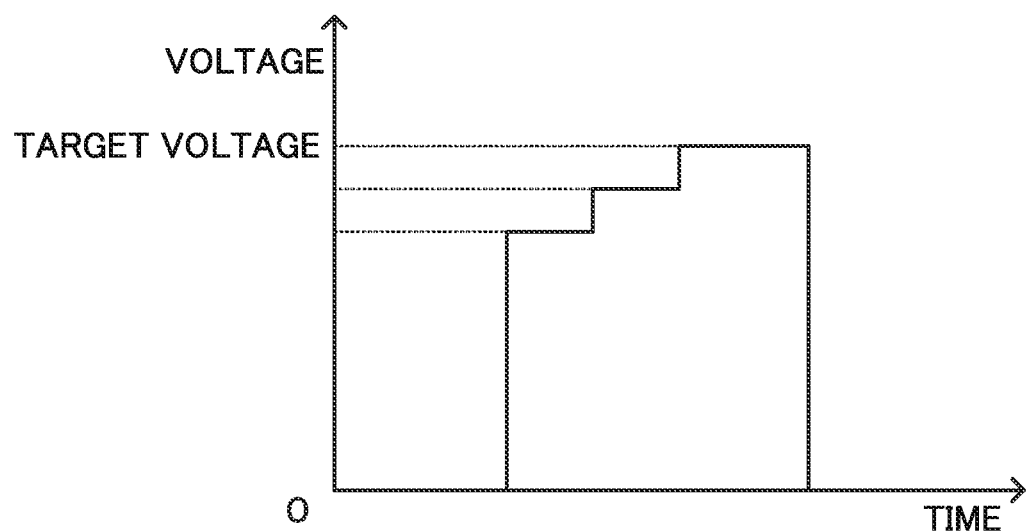
FIG. 19B is a diagram illustrating a second modified example of voltage application by a webbing take-up controlling device according to an exemplary embodiment.

In the exemplary embodiment described above, although explanation was given using an example in which the controller 102 raises a voltage to apply voltage to the motor 38 in a stepwise manner from the first voltage to the second voltage, there is no limitation thereto. For example, as illustrated in FIG. 19A, voltage may be applied to the motor 38 such that, after the first voltage has been applied to the motor 38, voltage is gradually raised to the second voltage such that the voltage step-up slopes up to the right. Alternatively, as illustrated in FIG. 19B, voltage may be applied to the motor 38 in three steps, or voltage may be applied to the motor 38 in four steps.

Additionally, although explanation has been given in which the processing performed by the controller 102 of the exemplary embodiment described above is processing by software, there is no limitation thereto. For example, the processing may be performed by hardware, or the processing may be performed by a combination of both hardware and software.

Additionally, the processing performed by the controller 102 of the exemplary embodiment described above may be stored and distributed as a program on a storage medium.

The present disclosure is not limited to the above, and obviously various other modifications may be implemented within a range not departing from the spirit of the present disclosure.

What is claimed is:

1. A webbing take-up controlling device comprising:
    a motor that is configured to operate a centrifugal clutch; and
    a controller that controls a voltage applied to the motor by initially applying a first voltage to the motor that is lower than a target voltage necessary to operate the centrifugal clutch after startup of the motor, and then applying the target voltage after startup of the motor and maintaining the target voltage.

2. The webbing take-up controlling device of claim 1, wherein:
    the first voltage is a voltage which produces a sufficient centrifugal force on the clutch which, when combined with a centrifugal force associated with the startup of the motor, exceeds a centrifugal force to operate the centrifugal clutch.

3. The webbing take-up controlling device of claim 1, wherein:
    the controller is configured to control the voltage applied to the motor such that, after the first voltage is applied, voltage is applied to the motor by raising the voltage to the target voltage in a stepwise manner.

4. The webbing take-up controlling device of claim 1, wherein:
    the controller is configured to control the voltage applied to the motor such that, after the first voltage is applied, voltage is applied to the motor by gradually raising the voltage to the target voltage.

5. The webbing take-up controlling device of claim 1, wherein:
    the centrifugal clutch is connected to a spool that takes up webbing, and the centrifugal clutch is operated by the motor being driven when the webbing is to be taken up on the spool.

* * * * *